United States Patent
Kato et al.

(10) Patent No.: US 11,407,367 B2
(45) Date of Patent: Aug. 9, 2022

(54) SOUNDPROOF BODY AND SILENCER FOR MOTOR VEHICLES

(71) Applicant: HOWA CO., LTD., Kasugai (JP)

(72) Inventors: Daisuke Kato, Kasugai (JP); Kousuke Ueda, Kasugai (JP)

(73) Assignee: HOWA CO., LTD., Kasugai (JP)

( * ) Notice: Subject to any disclaimer, the term of this patent is extended or adjusted under 35 U.S.C. 154(b) by 824 days.

(21) Appl. No.: 16/309,709

(22) PCT Filed: Mar. 22, 2018

(86) PCT No.: PCT/JP2018/011396
§ 371 (c)(1),
(2) Date: Dec. 13, 2018

(87) PCT Pub. No.: WO2018/180887
PCT Pub. Date: Oct. 4, 2018

(65) Prior Publication Data
US 2019/0135200 A1    May 9, 2019

(30) Foreign Application Priority Data

Mar. 27, 2017    (JP) .............................. JP2017-061008

(51) Int. Cl.
| | |
|---|---|
| *B60R 13/08* | (2006.01) |
| *B60N 3/04* | (2006.01) |
| *B60R 13/01* | (2006.01) |
| *G10K 11/168* | (2006.01) |
| *B32B 5/02* | (2006.01) |
| *B32B 27/12* | (2006.01) |

(Continued)

(52) U.S. Cl.
CPC ............ *B60R 13/083* (2013.01); *B32B 5/022* (2013.01); *B32B 27/12* (2013.01); *B32B 27/32* (2013.01); *B32B 27/34* (2013.01); *B60N 3/042* (2013.01); *B60N 3/048* (2013.01); *B60R 13/011* (2013.01); *G10K 11/168* (2013.01); *B32B 2262/0261* (2013.01); *B32B 2262/0284* (2013.01); *B32B 2262/065* (2013.01); *B32B 2262/08* (2013.01); *B32B 2307/102* (2013.01); *B32B 2605/08* (2013.01)

(58) Field of Classification Search
CPC ....... B60R 13/083; B32B 27/12; B32B 27/32; B32B 5/022
USPC ......................................................... 181/290
See application file for complete search history.

(56) References Cited

U.S. PATENT DOCUMENTS

| | | | |
|---|---|---|---|
| 9,616,824 B2* | 4/2017 | Fushiki | ............... B60R 13/0815 |
| 2011/0221223 A1* | 9/2011 | Mizata | .................. B60R 13/083 |
| | | | 296/39.3 |

(Continued)

FOREIGN PATENT DOCUMENTS

| | | |
|---|---|---|
| JP | H10-247085 A | 9/1998 |
| JP | 2004-294619 A | 10/2004 |

(Continued)

OTHER PUBLICATIONS

Jun. 19, 2018 International Search Report issued in International Patent No. PCT/JP2018/011396.

*Primary Examiner* — Forrest M Phillips
(74) *Attorney, Agent, or Firm* — Oliff PLC

(57) ABSTRACT

A soundproof body is formed by a two-layer lamination structure of a felt layer and a film layer. Some of plural fibers constructing the felt layer are formed to be thicker than the remaining fibers.

10 Claims, 21 Drawing Sheets

(51) Int. Cl.
     *B32B 27/34*         (2006.01)
     *B32B 27/32*         (2006.01)

(56) References Cited

U.S. PATENT DOCUMENTS

| | | | | |
|---|---|---|---|---|
| 2011/0226547 | A1* | 9/2011 | Kuhl | E04B 1/84 |
| | | | | 181/294 |
| 2012/0037447 | A1* | 2/2012 | Duval | B32B 7/02 |
| | | | | 181/290 |
| 2012/0234626 | A1* | 9/2012 | Ishikawa | B29C 66/73182 |
| | | | | 181/290 |
| 2013/0098707 | A1* | 4/2013 | Yamamoto | E04B 1/8409 |
| | | | | 181/290 |
| 2013/0153330 | A1* | 6/2013 | Fushiki | G10K 11/002 |
| | | | | 181/290 |
| 2016/0059797 | A1* | 3/2016 | Fushiki | B60R 13/0815 |
| | | | | 296/39.3 |
| 2019/0023197 | A1* | 1/2019 | Bathelier | G10K 11/168 |

FOREIGN PATENT DOCUMENTS

| | | |
|---|---|---|
| JP | 2011-197672 A | 10/2011 |
| JP | 2014-59537 A | 4/2014 |
| JP | 2015-18081 A | 1/2015 |

\* cited by examiner

| | film layer | felt layer |
|---|---|---|
| working example 6 | non-air permeable layer basis weight 30(g/m²) | 1st felt layer |
| working example 7 | | 2nd felt layer |
| working example 8 | | 3rd felt layer |
| comparative example b | | 4th felt layer |
| comparative example c | | 5th felt layer |

Fig.11

| felt layer | basis weight (g/m2) | PET fiber thickness (μm) | PET fiber content (%) | binder fiber content (%) | remaining fiber content (%) | presence of thickness direction arrangement | thickness (mm) | young's modulus |
|---|---|---|---|---|---|---|---|---|
| 1st felt layer | 800 | 30 | 50 | 30 | 30 | yes | 15 | 85000 |
| 2nd felt layer |  |  | 30 |  |  |  |  | 25000 |
| 3rd felt layer |  |  | 50 |  |  |  |  | 85000 |
| 4th felt layer |  | 20 | 50 |  |  | none |  | - |
| 5th felt layer |  |  | 50 |  |  |  |  | 8000 |

Fig.12

SOUNDPROOF BODY AND SILENCER FOR MOTOR VEHICLES

BACKGROUND OF THE INVENTION

Field of the Invention

The present invention relates to a soundproof body suitable for insulating noises and a silencer for motor vehicles suitable for performing soundproofing of noises propagating into motor vehicles.

Description of Related Art

Conventionally, as a soundproof body of this type, an ultralight soundproof body described in the following Patent Literature 1 has been proposed. The ultralight soundproof body includes a sound absorption layer and a non-air permeable resonant layer. The non-air permeable resonant layer is adhered to the sound absorption layer through an adhesive layer. Thus, the soundproof body resonates the sound absorption layer and the non-air permeable resonant layer at their interface thereby to absorb sounds so as to soundproof.

PRIOR ART DOCUMENT

Patent Literature

Patent Literature 1: Japanese Unexamined Patent Application Publication No. 2004-294619

SUMMARY OF THE INVENTION

Problem to be Solved by Invention

By the way, the soundproof body formed as described above is constructed by a two-layer structure of the sound absorption layer and the non-air permeable resonant layer through the adhesive layer.

Accordingly, when the of the soundproof body is arranged at its sound absorption layer along, for example, a dash panel which is a boundary component between an engine room and a vehicle compartment of a motor vehicle, engine sounds generated in the engine room propagates as noises in the interior of the vehicle compartment through the dash panel and the soundproof body in this order, Here, the noises are incident sequentially on the dash panel, the sound absorption layer, the adhesive layer, and the non-air permeable resonant layer. At this time the sound absorption layer functions as an air layer since the sound absorption layer is made of felt. Thus, the air layer which is the sound absorption layer functions as a spring layer in between the non-air permeable resonant layer in accordance with the sound pressure of the noises propagating through the dash panel in a process in which the noises are incident on the dash panel and the air layer as the sound absorption layer sequentially and further incident on the non-air permeable resonant layer through the adhesive layer.

Accordingly, when vibration of the resonant layer caused by air propagation of noises in the soundproof body formed by a lamination structure of the sound absorption layer and the non-air permeable layer becomes an opposite phase to vibration of the resonant layer caused by solid propagation of noises in a lamination structure of the sound absorption layer and the non-air permeable layer, the vibration of the resonant layer is stopped, and thus sound insulation performance of the soundproof body may be improved based on the mass law. On the other hand, when the vibration of the resonant layer caused by the air propagation of noises described above becomes the same phase to the vibration of the resonant layer caused by the solid propagation of noises described above, the vibration of the resonant layer becomes larger, and thus the sound insulation performance of the soundproof body is deteriorated based on the mass law.

Based on such phenomenon, in the soundproof body described above, the felt forming the sound absorption layer is normally formed by a plurality of thin fibers in order to enhance the sound insulation performance. Accordingly, although the sound absorption performance of the soundproof body is enhanced in a high frequency range of noises, the sound insulation performance of the soundproof body is deteriorated in a frequency range of the noises from a low frequency range to a middle frequency range.

Recently, the soundproof body adopted in the motor vehicles is required to improve the sound insulation performance in the frequency range of the noises from the low frequency range to the middle frequency range. As a countermeasure against the requirement, it is considered to increase the mass of the sound absorption layer. However, in such a case, the mass of the soundproof body is increased contrary to the requirement of light-weighting.

SUMMARY OF THE INVENTION

It is an object of the present invention to provide a soundproof body and a silencer for motor vehicles increasing at least a thickness of a portion of a plurality of fibers constructing a felt layer on which a non-air permeable layer or an air permeable layer is laminated, thereby to be capable of maintaining light-weighting and largely improving sound insulation performance over a frequency range from low frequency to middle frequency.

Means for Solving the Problem

In order to achieve the object according to the present invention, there is provided a soundproof body which includes a felt layer (40) formed by compounding a plurality of fibers into a predetermined binder fiber, and either one layer of a non-air permeable layer (50) and an air permeable layer (50a), which is laminated on the felt layer.

In the soundproof body, the felt layer is formed at its portion of a plurality of fibers by a fiber thicker than the remaining fibers.

In this way, by forming a portion of the plurality of fibers in the felt layer by the fiber thicker than the remaining fibers, a phase of vibration in either one layer of the non-air permeable layer and the air permeable layer when the noises pass through the felt layer by air propagation does not become the same phase of vibration in either of the non-air permeable layer and the air permeable layer when the noises propagate to either one layer of the non-air permeable layer and the air permeable layer through the felt layer by solid propagation in a frequency range of the noises from a low frequency range to a middle frequency range. Accordingly, the phase of vibration in the either one layer of the non-air permeable layer and the air permeable layer is shifted to an opposite phase to the phase of vibration in either of the non-air permeable layer and the air permeable layer. Consequently, the sound insulation performance of the either one layer of the non-air permeable layer and the air permeable layer may be largely improved.

Accordingly, the soundproof body is capable of maintaining light-weighting thereof and preferably improved in its soundproof performance beyond the mass law in the frequency range of the noises from the low frequency range to the middle frequency range. As a result, the soundproof body can be largely improved in its sound insulation performance.

Further, the present invention is characterized in that in the soundproof body, the air permeable layer is an air permeable layer which has air permeability capable of exerting sound insulation performance similar to sound insulation performance of the non-air permeable layer.

According to this construction, the air permeable layer has at its air permeability a value capable of exerting sound insulation performance similar to sound insulation performance of the non-air permeable layer, in addition to the construction in which some of the plurality of fibers in the felt layer is formed by fibers thicker than the remaining fibers like the above described soundproof body.

Thus, even if such an air permeable layer is laminated on the felt layer, the air permeable layer can maintain the light-weighting substantially similar to the non-air permeable layer. Further, the air permeable layer can be largely improved in its sound insulation performance based on the construction in which some of the plurality of fibers in the felt layer is formed by fibers thicker than the remaining fibers as described above. Accordingly, the soundproof body is preferably improved in its soundproof performance beyond the mass law in the frequency range of the noises from the low frequency range to the middle frequency range. As a result, the soundproof body can be largely improved in its sound insulation performance.

Further, the present invention is characterized in that in the soundproof body, the plurality of fibers in the felt layer are set at arrangement thereof to a crossing direction array in which the fibers intersect with both surfaces of the felt layer.

According to this construction, the arrangement of the plurality of fibers in the felt layer is set to the crossing direction array in which the fibers intersect with both surfaces of the felt layer in a lamination structure of the felt layer, in which some of the plurality of fibers is formed by fibers thicker than the remaining fibers like the above described soundproofing body, and either one layer of the non-air permeable layer and the air permeable layer.

Thus, the elasticity of the plurality of fibers in the felt layer in which some of the plurality of fibers is formed by fibers thicker than the remaining fibers can be largely enhanced compared to elasticity of a normal felt layer in which fibers are arranged along both surfaces of the felt layer. As a result, even if any fiber of the non-air permeable layer and the air permeable layer is adopted, the sound insulation performance of the felt layer in which some of the plurality of fibers is formed by fibers thicker than the remaining fibers can be largely improved compared to the normal felt layer in which the plurality of fibers are arranged along the both surfaces of the felt layer.

Such operation and effect can be attained in the same way, even if the air permeable layer out of the non-air permeable layer and the air permeable layer is an air permeable layer having air permeability capable of exerting sound insulation performance similar to sound insulation performance of the non-air permeable layer.

Further, in the soundproof body according to the present invention, the above-mentioned fibers thicker than the remaining fibers or the thick fibers may be set or predetermined at its outer diameter to a value within a predetermined outer diameter range capable of securing the sound insulation performance beyond a mass law in the either one layer of the non-air permeable layer and the air permeable layer over a frequency range from a low frequency range to a middle frequency range of noises.

Further, in the soundproof body according to the present invention, the thick fiber may be set or predetermined at its outer diameter to a value within a predetermined outer diameter range such that each vibration of air propagation and solid propagation caused between either one layer of the non-air permeable layer and the air permeable layer and a layer adjacent to the either one layer in a frequency range from a low frequency range to a middle frequency range of noises approach opposite in phase to each other.

Further, the present invention is characterized in that in the soundproof body, the felt layer in which some of the plurality of fibers is formed by fibers thicker than the remaining fibers is defined as one side felt layer, wherein an other side layer is laminated on the either one layer of the non-air permeable layer and the air permeable layer so as to face the one side felt layer through the either one layer and is formed by compounding into a predetermined binder fiber a plurality of fibers thinner than the above-mentioned thick fibers, which is some of the plurality of fibers, so as to become softer than the one side felt layer.

According to this construction, the other side felt layer exerts the sound absorption performance in addition to that the one side felt layer largely improves the sound insulation performance of either one layer of the non-air permeable layer and the air permeable layer beyond the mass law in the frequency range of the noises from the low frequency range to the middle frequency range.

As a result, compared to a soundproof effect caused by the sound insulation of a two-layer lamination structure formed of the one side felt layer and the either one layer, only soundproofing caused by the other side felt layer may be further improved. This means that the soundproofing effect of the soundproof body can be further improved by the synergistic effect of the sound insulation effect obtained by the one side felt layer and the either one layer of the non-air permeable layer and the air permeable layer and the sound absorption effect obtained by the other side felt layer.

Further, the present invention is characterized in that in the above-mentioned soundproof body, the felt layer in which some of the plurality of fibers is formed by fibers thicker than the remaining fibers is defined as one side felt layer, wherein an other side layer is laminated on the either one layer of the non-air permeable layer and the air permeable layer so as to face the one side felt layer through the either one layer, the other side layer being formed by compounding a plurality of fibers into a predetermined binder fiber and including at its portion of a plurality of fibers at least one of thick fibers thicker than the above-mentioned thick fibers which are the above-mentioned portion of fibers of the one side felt layer and a mass compound ratio larger than that of the thick fibers, thereby to have hardness substantially similar to hardness of the one side felt layer.

According to this construction, the one side felt layer and the other side felt layer similarly and synergistically affect vibration of either one layer of the non-air permeable layer and the air permeable layer. Accordingly, both of the one side felt layer and the other side felt layer function so as to improve the sound insulation performance of the either one layer beyond the mass law in the frequency range of the noises from the low frequency range to the middle frequency range. This means that the sound insulation performance of either one layer of the non-air permeable layer and the air permeable layer can be further improved in the frequency range of the noises from the low frequency range to the middle frequency range.

Herein, in the soundproof body, the mass compound ratio of the thick fiber may be set as a mass compound ratio within a predetermined range.

Further, in the above-mentioned soundproof body, the present invention includes one side felt layer (80) formed by compounding a plurality of fibers into a predetermined binder fiber, either one layer (50,50a) of a non-air permeable layer and an air permeable layer, the either one layer being laminated on the one side felt layer, and an other side felt layer (70) formed by compounding a plurality of fibers into a predetermined binder fiber, the other side felt layer being laminated on the either one layer to face the one side felt layer through the either one layer.

The one side felt layer is formed at each of plural fibers thereof by a thin fiber. The other side felt layer is formed at its portion of plural fibers thereof by a fiber thicker than each of the plural fibers in the one side felt layer.

According to this construction, the one side felt layer is softer than the other side felt layer, and therefore the one side felt layer hardly affects the vibration of either one layer of the non-air permeable layer and the air permeable layer. Thus, the one side felt layer functions as a sound absorption layer. On the contrary, the other side felt layer functions against the vibration of either one layer of the non-air permeable layer and the air permeable layer so as to improve the sound insulation performance beyond the mass law in the frequency range of the noises from the low frequency range to the middle frequency range.

As a result, even if the soundproof body is formed as the three-layer lamination structure formed by the one side felt layer not including a thick fiber, either one layer of the non-air permeable layer and the air permeable layer, and the other side felt layer including a thick fiber, the soundproof body can exert a preferable soundproof effect against the noises.

Herein, the air permeable layer may have air permeability which exerts sound insulation performance similar to sound insulation performance of the non-air permeable layer. According to this construction, in addition to the operation and effect described above, the air permeable layer can maintain light-weighting substantially similar to the non-air permeable layer and the soundproof body improves preferably the soundproof performance beyond the mass law in the frequency range of the noises from the low frequency range to the middle frequency range, thereby to be capable of improving largely the sound insulation performance.

Further, a plurality of fibers of the other side felt layer may be set at array thereof to a crossing direction array or arrangement so as to intersect both surfaces of the other side felt layer. According to this construction, in addition to the operation and effect described above, the sound shield performance of the other side felt layer against the noises can be largely improved compared to a normal felt layer in which fibers are arranged along both surfaces of the felt layer.

Further, the plurality of fibers of the other side felt layer may be set at array thereof to a crossing direction array so as to intersect or cross both surfaces of the other side felt layer.

Further, the above-mentioned thick fiber may be set at its outer diameter to a value within a predetermined outer diameter range so as to be capable of securing at either one layer of the non-air permeable layer and the air permeable layer the sound insulation performance beyond a mass law in a frequency range of noises from a low frequency range to a middle frequency range.

Further, the above-mentioned thick fiber may be set at its outer diameter to a value within a predetermined outer diameter range such that vibrations of air propagation and solid propagation caused between either one layer of the non-air permeable layer and the air permeable layer and a layer adjacent to the either one layer approach opposite phases to each other in a frequency range of noises from a low frequency range to a middle frequency range.

Further, according to the present invention, there is provided a silencer for motor vehicles is mounted to a portion of a vehicle body of a motor vehicle.

The silencer includes a soundproof body mounted to the portion of the vehicle body. The soundproof body includes a felt layer formed by compounding a plurality of fibers into a predetermined binder fiber, the felt layer being mounted on the portion of the vehicle body, and either one layer of a non-air permeable layer and an air permeable layer laminated on the felt layer. The felt layer is formed at a portion of plural fibers thereof by fibers thicker than the remaining fibers. The plural fibers are set at array thereof to a crossing direction arrangement so as to cross both surfaces of the felt layer.

According to this construction, the phase of the vibration in either one layer of the non-air permeable layer and the air permeable layer when the noises from the portion of the vehicle body into the vehicle compartment does not become the same phase of the vibration in either one layer of the non-air permeable layer and the air permeable layer when the noises is transmitted to the either one layer by solid propagation but becomes a phase shifted to an opposite phase against the phase of the vibration in the either one layer in a frequency range of noises from a low frequency range to a middle frequency range. Thus, the sound insulation performance of the either one layer can be largely improved.

Herein, a plurality of the fibers are set at array thereof to a crossing direction arrangement so as to cross both surfaces of the felt layer in a lamination structure of the felt layer, of which a portion of plural fibers is formed by fibers thicker than the remaining fibers, and either one layer of the non-air permeable layer and the air permeable layer.

Thus, elasticity of the plurality of fibers in the felt layer of which a portion of the plural fibers is formed by fibers thicker than the remaining fibers can be enhanced largely compared to a normal felt layer of which fibers are arranged along both surfaces thereof.

According to the above mentioned construction, even if any layer of the non-air permeable layer and the air permeable layer is adopted, the silencer can be maintain light-weighting thereof and improve sound insulation performance of the felt layer, of which a portion of the plural fibers is formed by fibers thicker than the remaining fibers, against the noises compared to a normal felt layer of which fibers are arranged along both surfaces of the normal felt layer.

Further, the present invention is characterized in that in the above described silencer, the portion of the vehicle body to which the silencer is mounted is a dash panel (30) partitioning an engine room (10) of the vehicle body and a vehicle compartment (20), and the soundproof body is a dash silencer (DS) mounted at its felt layer to the dash panel from an inner side of the vehicle compartment.

According to this construction, the phase of the vibration in either one layer of the non-air permeable layer and the air permeable layer when the noises from the engine room to the vehicle compartment passes through the felt layer under air propagation does not become the same phase of the vibration in either one layer of the non-air permeable layer and the air permeable layer when the noises are transmitted to the either one layer through the film layer by solid propagation, but becomes a phase shifted to an opposite phase. Thus, the sound insulation performance of the either one layer can be largely improved.

Accordingly, the soundproof body, namely the dash silencer can maintain light-weighting and be preferably improved at its soundproof performance in the frequency range of the noises from the low frequency range to the middle frequency range beyond the mass law. Thus, the soundproof body, namely the dash silencer can be largely improved in its sound insulation performance.

Herein, as described above, arrangement of the plural fibers in the felt layer is set to a crossing direction arrangement so as to cross both surfaces of the felt layer. Moreover, some of the plural fibers in the felt layer is formed by fibers thicker than the remaining fibers.

Thus, the elasticity of the plurality of fibers of the felt layer can be largely enhanced compared to a normal felt layer in which the fibers are arranged along both surfaces of the normal felt layer. As a result, in both the non-air permeable layer and the air permeable layer, the sound insulation performance of the felt layer against noises can be largely improved compared to the normal felt layer in which the fibers are arranged along both surfaces of the normal felt layer.

According to the above description, it is possible to provide a dash silencer for motor vehicles capable of exerting the preferable soundproof performance against the noises from the engine room to the vehicle compartment.

Further, the present invention is characterized in that in the silencer for motor vehicles, the portion of the vehicle body to which the silencer is mounted is a floor (FL) of the vehicle compartment of the vehicle body, and the soundproof body is interposed between the floor and a floor carpet (20a) laid on the floor from an inner side of the vehicle compartment as a floor silencer (FS), and of which the felt layer is disposed along the floor and the either one layer of the non-air permeable layer and the air permeable layer is laminated on the felt layer between the felt layer and the floor carpet.

According to this construction, even when road noises generated from a road in moving on the road by the motor vehicle or engine sounds generated so as to wrap around to a lower side of the floor from the engine are incident as noises on the floor silencer through the floor under the construction of the felt layer in which some of the plural fibers are formed by fibers thicker than the remaining fibers and in which the plural fibers are set at array thereof to the crossing direction arrangement so as to intersect the both surfaces of the felt layer, as described above, the noises can be preferably insulated or soundproofed from the vehicle compartment by the felt layer having the above mentioned construction together with the sound insulation performance of the air permeable layer and the non-air permeable layer.

Further, the present invention is characterized in that in the silencer for motor vehicles, the portion of the vehicle body to which the silencer is mounted is a luggage compartment (110) provided at a rear portion of the vehicle body and the soundproof body is interposed as a partition silencer (PS) between an inner surface of the luggage compartment and a luggage compartment trim (110) formed along the inner surface of the luggage compartment, and in which the felt layer is disposed along the inner surface of the luggage compartment and the either one layer is laminated on the felt layer between the felt layer and the luggage compartment trim.

According to this construction, even when road noises generated from rear wheels in moving on a road by the motor vehicle are incident as noises on the vehicle compartment through the luggage compartment under the construction of the felt layer in which some of the plural fibers are formed by fibers thicker than the remaining fibers and in which the plural fibers are set at array thereof to the crossing direction arrangement so as to intersect the both surfaces of the felt layer, as described above, the noises can be preferably insulated or soundproofed from the vehicle compartment by the partition silencer under the sound insulation performance of the felt layer together with the sound insulation performance of the either one layer of the non-air permeable layer and the air permeable layer.

Further, according to the present invention, there is provided a silencer for motor vehicles is mounted to a portion of a vehicle body of a motor vehicle.

The silencer includes a soundproof body mounted to the portion of the vehicle body. The soundproof body includes a one side felt layer formed by compounding a plurality of fibers into a predetermined binder fiber, the one side felt layer being mounted to the portion of the vehicle body, either one layer of a non-air permeable layer and an air permeable layer laminated on the one side felt layer, and an other side felt layer formed by compounding a plurality of fibers into a predetermined binder fiber, the other side felt layer being laminated on the either one layer to face the one side felt layer through the either one layer. The one side felt layer is formed at each of the plural fibers thereof by thin fibers. The other side felt layer is formed at some of plural fibers thereof by fibers thicker than each of the plural fibers of the one side felt layer. The plurality of fibers of the other side felt layer are set at array thereof to a crossing direction arrangement so as to cross both surfaces of the other side felt layer.

with this construction, the one side felt layer is softer than the other side felt layer, and therefore the one side felt layer hardly affects the vibration of either one layer of the non-air permeable layer and the air permeable layer. Consequently, the one side felt layer functions as a sound absorption layer.

Meanwhile, the other side felt layer in which some of the plural fibers are formed by fibers thicker than each of the fibers of the one side felt layer functions so as to improve the sound insulation performance of the either one layer beyond the mass law in the frequency range of the noises from the low frequency range to the middle frequency range.

Moreover, the plurality of fibers in the other side felt layer are set at array thereof to a crossing direction arrangement so as to cross both surfaces of the other side felt layer, as described above. Thus, the sound insulation performance of the other side felt layer against the noises can be largely improved compared to a normal felt layer in which fibers are arranged along both surfaces of the normal felt layer. Accordingly, even if the soundproof body is formed as the three-layer lamination structure formed by the one side felt layer not including thick fibers, the either one layer of the non-air permeable layer and the air permeable layer, and the other side felt layer including thick fibers, the soundproof body can exert a preferable soundproof effect against the noises.

Further, the present invention is characterized in that in the silencer for motor vehicles, the portion of the vehicle body to which the silencer is mounted is a dash panel (30) partitioning an engine room (10) and a vehicle compartment

(20) of the vehicle body, and the soundproof body is a dash silencer (DS) mounted to the dash panel from an inner side of the vehicle compartment.

With this construction, the other side felt layer is formed at its portion of the plural fibers by fibers thicker than each of the fibers of the one side felt layer and the fibers of the other side felt layer are set at array thereof to the crossing direction arrangement so as to cross the both surfaces of the other side felt layer, as described above. Thus, it is possible to provide a dash silencer for motor vehicles capable of exerting further preferable soundproof performance against the noises from the engine room to the vehicle compartment on a basis of the three-layer lamination structure formed by the one side felt layer, the above mentioned either one layer, and the other side felt layer.

Further, the present invention is characterized in that in the above described silencer for motor vehicles, the portion of the vehicle body to which the silencer is mounted is a floor (FL) of the vehicle compartment of the vehicle body, and the soundproof body is interposed between the floor and a floor carpet (20a) laid on the floor from an inner side of the vehicle compartment as a floor silencer (FS), and of which the one side felt layer is disposed along the floor, and the other side felt layer is laminated on the one side felt layer between the one side felt layer and the floor carpet through the either one layer of the non-air permeable layer and the air permeable layer.

According to this construction, the other side felt layer is formed at its portion of the plural fibers by fibers thicker than each of the fibers of the one side felt layer and the plural fibers of the other side felt layer is set at array thereof to the crossing direction arrangement so as to cross the both surfaces of the other side felt layer, as described above. Consequently, road noises generated from a road on driving of the motor vehicle on the road or engine sounds generated from the engine wrapping around to a lower side of the floor can be preferably insulated or soundproofed as noises from the vehicle compartment by the three-layer lamination structure formed by the one side felt layer, the either one layer, and the other side felt layer.

Further, the present invention is characterized in that in the silencer for motor vehicles, the portion of the vehicle body to which the silencer is mounted is a luggage compartment (110) provided at a rear portion of the vehicle body, and the soundproof body is interposed as a partition silencer (PS) between an inner surface of the luggage compartment and a luggage compartment trim (110) formed along the inner surface of the luggage compartment, and in which the felt layer is disposed along the inner surface of the luggage compartment and the other side felt layer is laminated on the one side felt layer between the one side felt layer and the luggage compartment trim through the either one layer of the non-air permeable layer and the air permeable layer.

According to this construction, the other side felt layer is formed at its portion of the plural fibers by fibers thicker than each of the fibers of the one side felt layer, and the plural fibers of the other side felt layer are set at array thereof to the crossing direction arrangement so as to cross the both surfaces of the other side felt layer, as described above. Thus, road noises generated from rear wheels in driving a road by the motor vehicle can be preferably insulated or soundproofed as noises from the vehicle compartment by the partition silencer under the sound insulation performance of the other side felt layer on a basis of the three-layer lamination structure formed by the one side felt layer, the either one layer, and the other side felt layer, together with the sound insulation performance of the either one layer of the air permeable layer and the non-air permeable layer.

BRIEF DESCRIPTION OF THE DRAWINGS

Other features and advantages of the invention will be apparent from the following description taken in connection with the accompanying drawings.

FIG. 11 indicates a table illustrating a configuration of each of working examples and each of comparative examples according to the sixth embodiment.

FIG. 12 indicates a table illustrating a specification and characteristic of each of first to fifth felt layers according to the sixth embodiment.

DETAILED DESCRIPTION OF THE PREFERRED EMBODIMENTS

Hereinafter, each embodiment of the present invention will be described below, referring to the attached drawings.

First Embodiment

Figure 1:
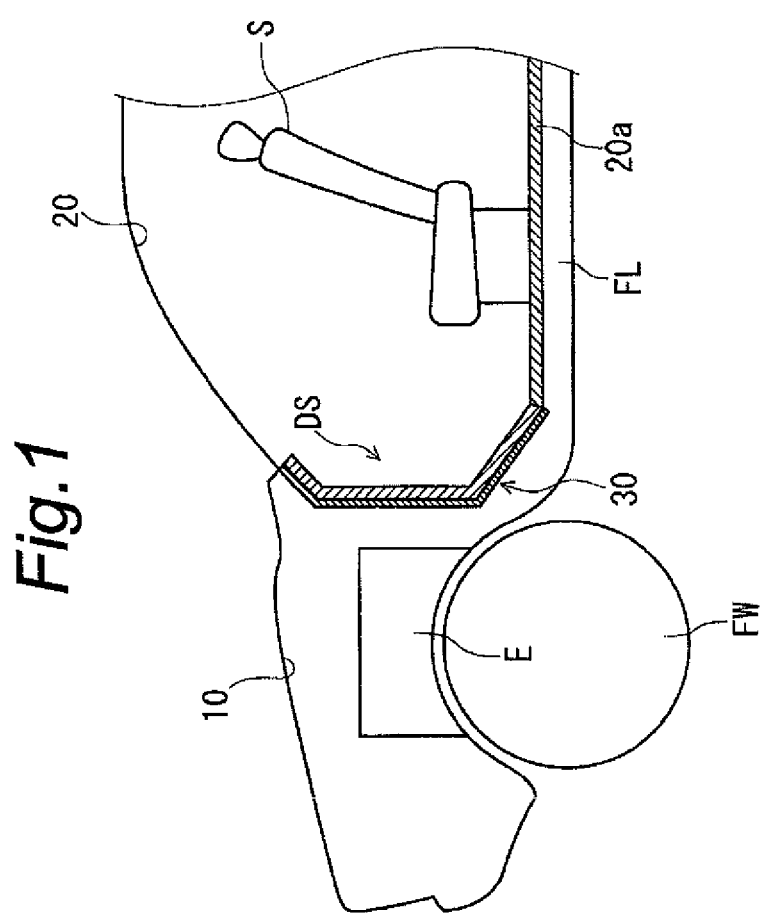
FIG. 1 indicates a schematic partial cross-sectional view of a motor vehicle to which a first embodiment of a silencer for motor vehicles as a dash silencer according to the present invention is applied.

FIG. 1 indicates a first embodiment of the present invention. In the first embodiment, an example in which the present invention is applied as a dash silencer (hereinafter, referred to as a dash silencer DS) of a silencer for motor vehicles to a motor vehicle is illustrated.

As shown in FIG. 1, the motor vehicle includes an engine room 10 and a vehicle compartment 20. The vehicle compartment 20 is established following the engine room 10 in the motor vehicle. In addition, in FIG. 1, a reference numeral E indicates an engine disposed in the engine room 10, and a reference numeral FW indicates a front wheel of the motor vehicle. Further, a front seat S is disposed in the vehicle compartment 20, and a floor sheet 20a (also called floor carpet 20a) is laid on a floor FL of the vehicle compartment 20.

The motor vehicle includes a dash panel 30 (also called a dash board 30). The dash panel 30 is formed in a curved shape in a vertical cross section as shown in FIG. 1. The dash panel 30 is disposed at a boundary between the engine room 10 and the vehicle compartment 20, thereby to partition the engine room 10 and the vehicle compartment 20 to each other. Additionally, in the first embodiment, the dash panel 30 is formed by, for example, a steel plate having a thickness of 0.8 (mm). The dash panel 30 is connected to a lower end portion of a front window shield of the vehicle compartment 20 at its extending upper end portion. An extending lower end portion of the dash panel 30 is connected to a front end portion of the floor FL of the vehicle compartment 20.

Figure 2:
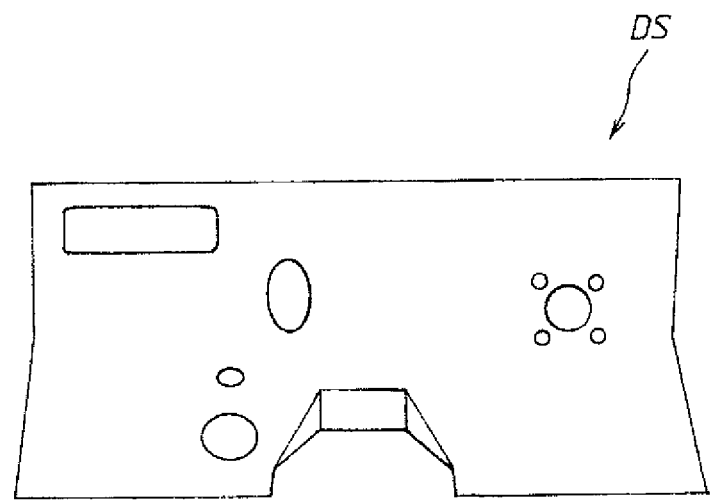
FIG. 2 indicates an enlarged front view of the dash silencer shown in FIG. 1.

The motor vehicle also includes the dash silencer DS. The dash silencer DS is, as shown in FIG. 1, formed a curved shape in the vertical cross section similar to the dash panel 30 and is assembled along the dash panel 30 from a side of the vehicle compartment 20. Additionally, in the first embodiment, an outer peripheral shape of the dash silencer DS (see FIG. 2) is the substantially same as an outer peripheral shape of the dash panel 30.

Figure 3:
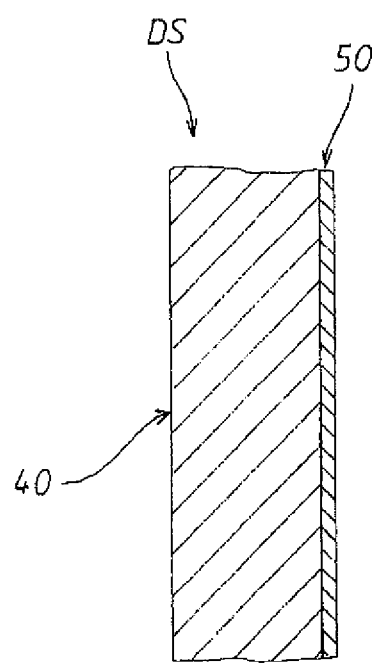
FIG. 3 indicates an enlarged partial vertical cross-sectional view of the dash silencer shown in FIG. 1.

As shown in FIG. 3, the dash silencer DS includes a felt layer 40 and a film layer 50. The felt layer 40 is mounted along the dash panel 30 from a side of the vehicle compartment 20. The film layer 50 is laminated along the felt layer 40 from a rear side of the motor vehicle. In addition, the felt layer 40 is a kind of a sound absorption layer formed of felt which is a porous material. The film layer 50 is a kind of a non-air permeable layer formed of a single film.

The felt layer 40 is formed by compounding a plurality of fibers uniformly into a predetermined binder fiber. Herein, a plurality of fibers forming the felt layer 40 is compounded into the predetermined binder fiber along both surfaces of the felt layer 40. In the first embodiment, the plurality of fibers includes six kinds of fibers of cotton, wool, hemp, silk, nylon, and polyethylene terephthalate (hereinafter, referred to as PET). The fibers of PET among the fibers of cotton, wool, hemp, silk, nylon, and PET are respectively formed to be thicker than each fiber of cotton, wool, hemp, silk, and nylon. Further, as the predetermined binder fiber described above, fiber of thermoplastic resin or thermosetting resin are mentioned.

Herein, each fiber of cotton, wool, hemp, silk and nylon excluding PET among the plurality of fibers of the felt layer 40 is formed of a thin fiber with an average outer diameter of approximately 20 ($\mu$m) and has only an outer diameter of about 30 ($\mu$m) even if each fiber is thick. The reason why such thin fibers are adopted is generally for securing sound absorption performance.

In contrast with this fiber construction, the fiber of PET is thicker than each fiber of cotton, wool, hemp, silk, and nylon other than PET, as described above. In addition, weight per unit area or basis weight and a thickness of the felt layer 40 are set to, for example, 1000 (g/m$^2$) and 20 (mm).

Herein, the reason why thick fibers are included in the fibers of the felt layer, as described above will be described. As described at the beginning of this specification, in the soundproof body the felt layer is normally formed only by a plurality of thin fibers in order to improve the sound absorption performance. Therefore, the sound insulation or shield performance of the non-air permeable layer such as a film layer and so on in the soundproof body is improved in a high frequency range of the noises, while the sound insulation performance of the soundproof body is deteriorated in a frequency range of the noises from a low frequency range to a middle frequency range, and this does not lead to improvement.

In the first embodiment, the low frequency range of the noises is a range from 200 (Hz) to 400 (Hz) at a center frequency of a ⅓ octave band. The middle frequency range is a range from 400 (Hz) to 1600 (Hz). The high frequency range is a range from 1600 (Hz) and 6300 (Hz). Additionally, the noises in the frequency range from 200 (Hz) to 6300 (Hz) correspond to noises generated mainly from the engine of the motor vehicle.

Thus, for responding the requirement to improve the sound insulation performance of the non-air permeable layer in the frequency range of the noises from the low frequency range to the middle frequency range, the inventors examined or conducted various studies relating to construction of the felt layer laminated on the non-air permeable layer. In the review process, the inventors focused on that each fiber forming the felt layer is normally formed by a thin fiber with a thickness of approximately 20 ($\mu$m) and investigated regarding how the sound insulation performance changes based on taking measure in which a portion or some fibers of a plurality of fibers is changed to fibers thicker than the remaining fibers.

According to this investigation, it has been found that the sound shield performance is largely improved by adjusting an outer diameter and a mass compound ratio of the thick fiber in the felt layer in a frequency range of the noises from 200 (Hz) to 1600 (Hz) over the low frequency range to the middle frequency range among a frequency range of the noises from 200 (Hz) to 6300 (Hz). In addition, the mass compound ratio described above denotes a compound rate of a mass of a thick fiber or a thin fiber to the total mass of all fibers in the felt layer.

Such an improvement can be secured by the fact that a portion or some fibers among plural fibers of the felt layer is set to be thicker than the remaining fibers in the lamination structure formed by the felt layer and the non-air permeable layer constructing the soundproof body in the present embodiment, and thereby a phase of vibration of the non-air permeable layer caused by solid propagation of noises does not become the same phase of vibration of the non-air permeable layer caused by air propagation of the noises in the frequency range of the noises from the low frequency range to the middle frequency range but becomes a phase shifted from the phase of vibration of the non-air permeable layer caused by air propagation of the noises, in other words, is changed toward a phase opposite to the phase of the vibration of the non-air permeable layer caused by air propagation of the noises.

In the embodiment, the outer diameter of the thick fiber (fiber of PET) in the felt layer is set to 100 ($\mu$m). The mass compound ratio of the thick fiber among the plurality of fibers in the felt layer is set to 30(%). In addition, a compound rate of the predetermined binder fiber to the thick fibers in the felt layer is set to 50(%).

The felt layer thus constructed is manufactured as described below. A plurality of fibers (thick fibers of PET and each of thin fibers of cotton, wool, hemp, silk and nylon) and a predetermined binder fiber are prepared as materials. Thereafter, the materials are mixed such that a compound rate of the predetermined binder fiber is 50(%), a mass compound ratio of the thick fibers respectively with an outer diameter of 100 ($\mu$m) is 30%, and a mass compound ratio of each of the thin fibers respectively with an outer diameter of approximately 20 ($\mu$m) is 70(%). Thereafter, the mixed materials are uniformly compounded and then manufactured as the felt layer through processes of heating, cooling, cutting or the like.

On the other hand, the film layer 50 described above is constructed by a non-air permeable layer formed by a single film. As a material for forming the film layer 50, nylon is selected. In addition, a thickness of the film layer 50 is, for example, 20 ($\mu$m).

In the first embodiment described above, when the engine E is operated and generates engine sounds as noises, the noises are incident on the dash silencer DS through the dash panel 30.

Herein, the dash panel 30 is formed of a steel plate. Therefore, the noises incident on the dash panel 30 are partially insulated by the dash panel 30 under its non-air permeable performance and then incident on the dash silencer DS.

When the noises are incident on the dash silencer DS in this way, the noises are incident on the felt layer 40 adjacent to the dash panel 30. Accordingly, the noises incident on the felt layer 40 are partially absorbed by the felt layer 40 under its porous property and are incident on the film layer 50 through the felt layer 40.

When the noises are incident on the film layer 50 through the felt layer 40 in this way, the noises cause vibration in the film layer 50 in accordance with the level fluctuation of sound pressure thereof since the film layer 50 has a non-air permeable property.

At this stage, a phase of vibration of the film layer 50 when the noises pass through the felt layer 40 with air propagation does not become the same phase of vibration of the film layer 50 when the noises are transmitted to the film layer 50 through the film layer 40 by solid propagation but become a phase shifted toward an opposite phase in the frequency range of the noises from the low frequency range to the middle frequency range. Thus, the sound insulation performance of the soundproof body can be largely improved in the frequency range of the noises from the low frequency range to the middle frequency range.

As described above, in the first embodiment, the dash silencer DS can largely improve the sound insulation performance of the film layer 50 beyond the mass law in the frequency range of the noises from the low frequency range to the middle frequency range under the lamination structure of the felt layer 40 and the film layer 50 as described above.

This means that the soundproof performance of the dash silencer DS can be preferably improved in the frequency range of the noises from the low frequency range to the middle frequency range beyond the mass law on a basis of the outer diameter each of the thick fibers and the mass compound ratio of the thick fibers among the plurality of fibers of the felt layer 40. In addition, the sound insulation performance of the dash silencer DS in the high frequency range of the noises can be obtained as a performance over the mass law, as conventionally.

As a result, even if engine sounds from the engine room 10 are incident on the dash silencer DS as noises, the noises can be preferably insulated by the dash silencer DS in the frequency range from the low frequency range to the high frequency range. This means that the soundproofing effect of the dash silencer DS against the engine sounds can be satisfactorily achieved in the frequency range of the noises from the low frequency range to the high frequency range.

Further, as described above, only the fibers of PET become thick among the fibers constructing the felt layer 40, and therefore the basis weight (mass) of the felt layer 40 is not particularly increased. Furthermore, the film layer 50 is formed by a non-air permeable layer of a single film and thus merely has a basis weight similar to the conventional one. Accordingly, the dash silencer DS does not become heavier than the conventional one, and therefore is suitable for light-weighing.

Incidentally, denoting the dash silencer DS constructed as described above as a working example 1, a transmission loss characteristic of the working example 1 was measured by a transmission loss test in relation with the frequency of the noises. For this measurement, working examples 2 to 5 and a comparative example a were prepared. The transmission loss characteristic indicates a relationship between insertion loss (dB) and frequency (Hz). Here, the insertion loss denotes the transmission loss of only the felt layer 40 which is obtained by excluding the transmission loss of the dash panel 30 from the transmission loss of the lamination structure of the dash panel 30 and the felt layer 40. Accordingly, the insertion loss in the transmission loss characteristic described above also denotes the transmission loss.

Additionally, the transmission loss in the transmission loss characteristic is a difference between an incident sound and a transmission sound. As the difference is smaller, the transmission loss is smaller because the transmission of the sound is much, and therefore the sound insulation performance is inferior. As the difference is larger, the transmission loss is larger because the transmission of the sound is less, and therefore the sound insulation performance is superior.

Each construction of the working examples 1 to 5 and the comparative example a described above is as below. Herein, these working examples 1 to 5 and comparative example a are constructed by the lamination structure consisting of the felt layer and the film layer. The plural fibers forming the felt layer includes six kinds of fibers of cotton, wool, hemp, silk, nylon and PET as described in the first embodiment. Also, the basis weight and the thickness of the felt layer are set to approximately 1000 (g/m$^2$) and approximately 20 (mm) respectively. However, the constructions of the fibers of PET are mutually different in each working example and the comparative example.

Furthermore, the film layer is common in the working examples and the comparative example and is formed by a film formed of nylon having a thickness of 20 (μm) forming the film layer 50 described in the first embodiment.

Working Example 1

The working example 1 is formed by the lamination structure similar to the dash silencer DS of the first embodiment. In the working example 1, the average outer diameter of each fiber of cotton, wool, hemp, silk, and nylon among the six kinds of fibers of the felt layer is as thin as approximately 20 (μm), and the outer diameter of each of the fibers of PET is as thick as approximately 100 (μm). Further, the mass compound ratio of the fibers of PET in the felt layer is set to 30(%), and the compound rate of the predetermined binder fiber is set to 50(%).

Working Example 2

In the working example 2, the average outer diameter of each of fibers of cotton, wool, hemp, silk, and nylon among the six kinds of fibers of the felt layer is set to be as thin as approximately 20 (μm), and the outer diameter of each of the fibers of PET is set to be as thick as approximately 100 (μm). Further, the mass compound ratio of the fibers of PET in the felt layer is set to 50(%), and the compound rate of the predetermined binder fiber is set to 30(%).

Working Example 3

In the working example 3, the average outer diameter of each of fibers of cotton, wool, hemp, silk, and nylon among the six kinds of fibers of the felt layer is set to be as thin as approximately 20 (μm), and the outer diameter of each of the fibers of PET is set to be as thick as approximately 100 (μm). Further, the mass compound ratio of the fibers of cotton in the felt layer is set to 60(%), and the compound rate of the predetermined binder fiber is set to 20(%).

Working Example 4

In the example 4, the average outer diameter of each of fibers of cotton, wool, hemp, silk, and nylon among the six kinds of fibers in the felt layer is set to be as thin as approximately 20 (μm), and the outer diameter of each of the fibers of PET is set to be as thick as approximately 35 (μm). Further, the mass compound ratio of the fibers of PET in the felt layer is set to 30(%), and the compound rate of the predetermined binder fiber is set to 50(%).

Working Example 5

In the working example 5, the average outer diameter of each of fibers of cotton, wool, hemp, silk, and nylon among the six kinds of fibers in the felt layer is set to be as thin as approximately 20 (μm), and the outer diameter of each of the fibers of PET is set to be as thick as approximately 70 (μm). Further, the mass compound ratio of the fibers of PET in the felt layer is set to 30(%), and the compound rate of the predetermined binder fiber is set to 50(%).

Comparative Example a

The comparative example a has a structure as a conventional soundproof body. In the comparative example a, the six kinds of fibers including the fibers of PET are set at their outer diameters respectively to be approximately 20 (μm) which is similar to the average outer diameter of each fiber of cotton, wool, hemp, silk and nylon described above.

So, the transmission loss characteristic of each of the working examples 1 to 5 and the comparative example a was measured by the transmission loss test in relation with the frequency of the noises.

Figure 4:
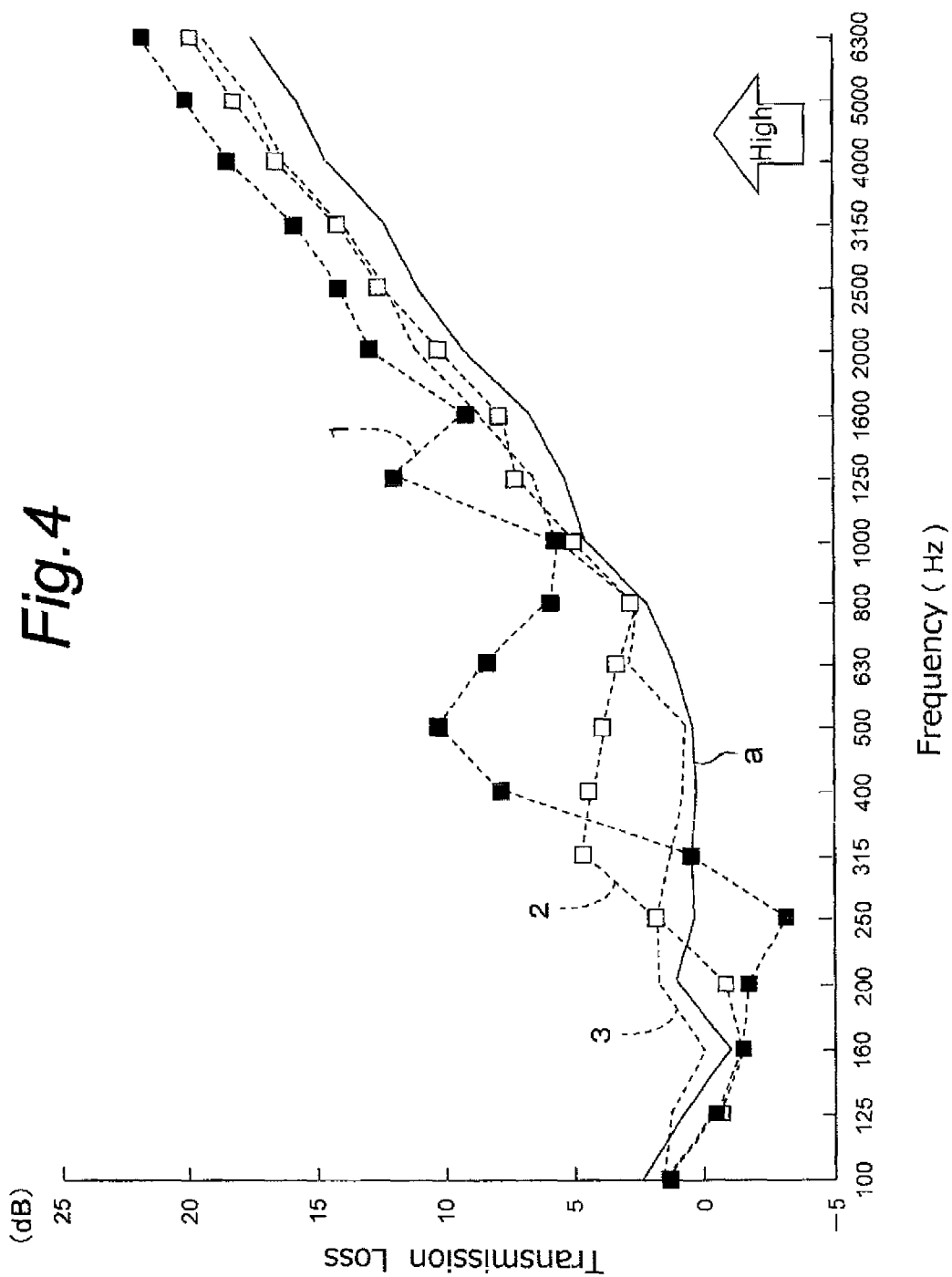
FIG. 4 indicates graphs of which each illustrates a relationship between a transmission loss and a frequency of noises in each of working examples 1 to 3 and a comparative example a according to the first embodiment.
Figure 5:
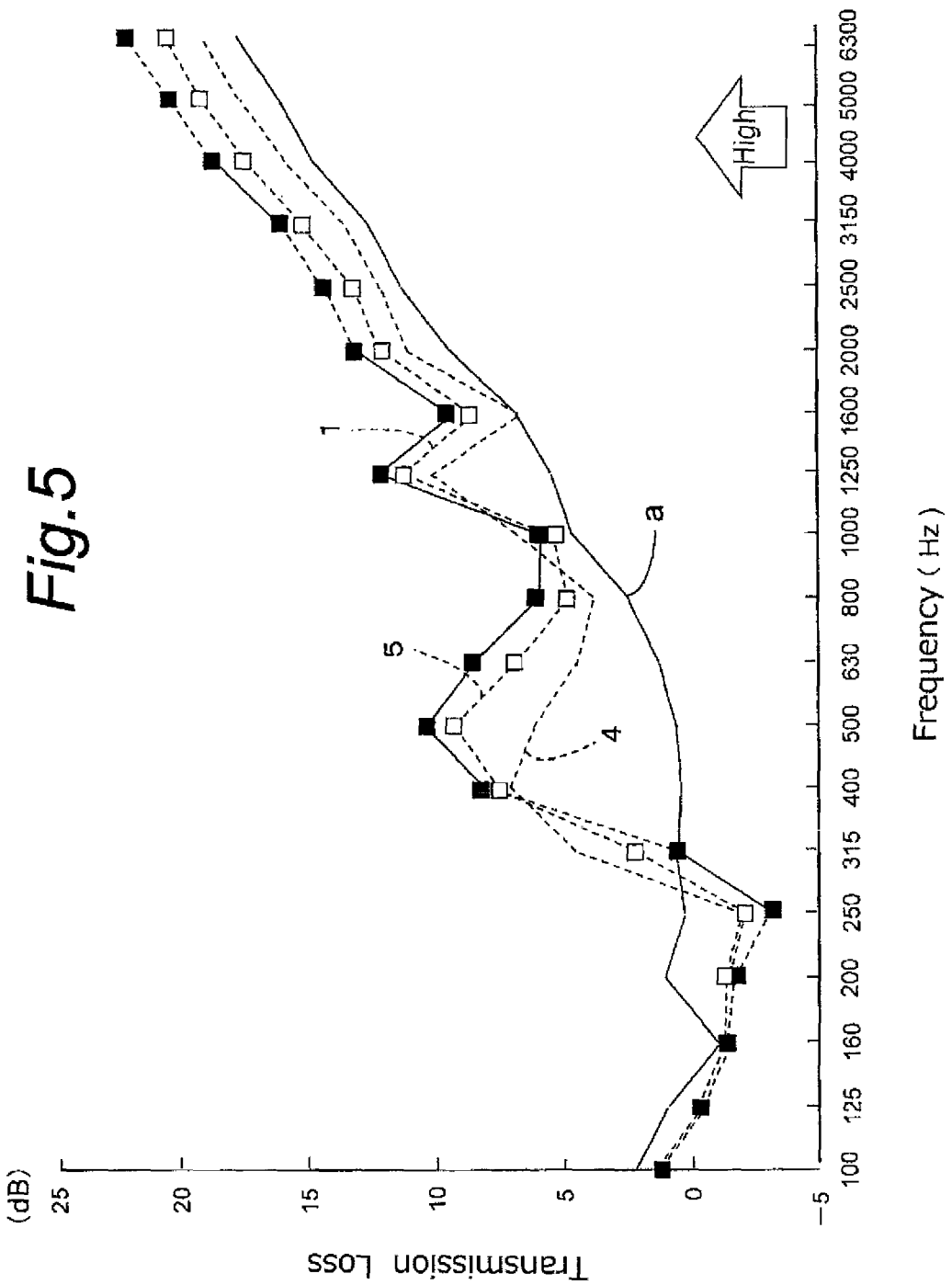
FIG. 5 indicates graphs of which each illustrates a relationship between a transmission loss and a frequency of noises in each of examples 1, 4 and 5 and the comparative example a according to the first embodiment.

As a result of the measurement of the transmission loss property of each of the working examples 1 to 5 and the comparative example a, graphs 1 to 5 and a shown in FIG. 4 and FIG. 5 were obtained respectively as a line graph. Additionally, FIG. 4 indicates each of the graphs 1 to 3 and a. FIG. 5 indicates the graphs 1, 4, 5 and a.

Herein, In FIG. 4, each of the graphs 1 to 3 indicates a relationship of the transmission loss of each of the working examples 1 to 3 with the frequency of the noises. These graphs 1 to 3 indicate respectively examples in which in the working examples 1 to 3, the mass compound ratio of the fibers of PET is changed while maintaining the outer diameter of each thick fiber of PET of the felt layer constant. The graph a indicates a relationship of the transmission loss of the comparative example a with the frequency of the noises.

In FIG. 5, the graphs 1, 4, and 5 indicate respectively relationship of the transmission losses of the working examples 1, 4, and 5 with the frequency of the noises. These graphs 1, 4, and 5 indicate respectively examples in which the outer diameter of each of the thick fibers of PET is changed while maintaining the mass compound ratio of the thick fibers of PET in the felt layer constant. The graph a indicates a relationship of the transmission loss of the comparative example a with the frequency of the noises.

Herein, in FIG. 4, each of the graphs 1 to 3 is compared with the graph a. The graph 1 indicates that the transmission loss is larger than the transmission loss indicated by the graph a in a frequency range of 315 (Hz) or higher. In other words, the working example 1 has better insulation performance than that of the comparative example a under the outer diameter of 100 (m) and the mass compound ratio of 50(%) of the fibers of PET at least in a range of 315 (Hz) to 400 (Hz) of the low frequency range and the middle frequency range of 400 (Hz) to 1600 (Hz). Further, the working example 1 has preferable sound insulation performance in the high frequency range of 1600 (Hz) to 6300 (Hz), as conventionally. This means that in the working example 1, the sound insulation performance is largely improved especially from the low frequency range to the middle frequency range.

The graph 2 indicates that the transmission loss is larger than the transmission loss indicated by the graph a in the frequency range of 250 (Hz) or higher. This means that the working example 2 has better insulation performance than that of the comparative example a under the outer diameter of 100 (m) and the mass compound ratio of 60(%) of the fibers of PET at least in a range of 250 (Hz) to 400 (Hz) of the low frequency range and the middle frequency range of 400 (Hz) to 1600 (Hz). In addition, the working example 2 has better sound insulation performance than that of the comparative example a in the high frequency range of 1600 (Hz) to 6300 (Hz), as conventionally.

Further, the graph 3 indicates that the transmission loss is larger than the transmission loss indicated by the graph a in the frequency range of 125 Hz or higher. This means that the working example 3 has better insulation performance than that of the comparative example a under the outer diameter of 100 (μm) and the mass compound ratio of 60(%) of the fibers of PET at least in a range of 200 (Hz) to 400 (Hz) of the low frequency range and the middle frequency range of 400 (Hz) to 1600 (Hz). In addition, the working example 3 has better sound insulation performance than that of the comparative example a in the high frequency range of 1600 (Hz) to 6300 (Hz), as conventionally.

Next, in FIG. 5, each of the graphs 1, 4, and 5 is compared with the graph a. In FIG. 5, the graph 1 is the same as the graph 1 indicated in FIG. 4. Further, in FIG. 5, the graph 1 indicates that the transmission loss is larger than the transmission loss indicated by the graph a in the frequency of approximately 315 (Hz) or higher.

This means that the working example 1 has better insulation performance than that of the comparative example a under the outer diameter of 100 (μm) and the mass compound ratio of 30(%) of the fibers of PET at least in a range of 315 (Hz) to 400 (Hz) of the low frequency range and the middle frequency range of 400 (Hz) to 1600 (Hz). In addition, the working example 1 has better sound insulation performance than that of the comparative example a in the high frequency range of 1600 (Hz) to 6300 (Hz), as conventionally.

Further, in FIG. 5, the graph 4 indicates that the transmission loss is larger than the transmission loss indicated by the graph a in the frequency range of approximately 315 Hz or higher. This means that the working example 4 has better insulation performance than that of the comparative example a under the outer diameter of 35 (μm) and the mass compound ratio of 30(%) of the fibers of PET at least in a range of 315 (Hz) to 400 (Hz) of the low frequency range and the middle frequency range of 400 (Hz) to 1600 (Hz). In addition, the working example 4 has better sound insulation performance than that of the comparative example a in the high frequency range of 1600 (Hz) to 6300 (Hz), as conventionally.

Furthermore, in FIG. 5, the graph 5 indicates that the transmission loss is larger than the transmission loss indicated by the graph a in the frequency range of approximately 315 Hz or higher. This means that the working example 5 has better insulation performance than that of the comparative example a under the outer diameter of 70 (μm) and the mass compound ratio of 30(%) of the fibers of PET at least in a range of about 315 (Hz) to 400 (Hz) of the low frequency range and the middle frequency range of 400 (Hz) to 1600 (Hz). In addition, the working example 5 has better sound insulation performance than that of the comparative example a in the high frequency range of 1600 (Hz) to 6300 (Hz), as conventionally.

According to the above descriptions, it is understood that each of the working examples 1 to 5 has better sound insulation performance than that of the comparative example a not only in the high frequency range of 1600 (Hz) to 6300 (Hz) but also in the low frequency range of approximately 315 (Hz) or higher and the middle frequency range of 400 (Hz) to 1600 (Hz).

This means that each of the working examples 1 to 5 has better sound insulation performance than that of the comparative example a in a frequency range over the low frequency range of approximately 315 Hz or higher and the middle frequency range, and the high frequency range and that the sound insulation performance of each of the working examples 1 to 5 is largely improved particularly in the low frequency range of approximately 315 (Hz) or higher and the middle frequency range.

Furthermore, in addition to the examples 1 to 5, various working examples in which compound rate of the predetermined binder fiber and the outer diameter and the mass compound ratio of the fibers of PET are different with each other were prepared and the transmission loss characteristics of these various working examples were measured by the transmission loss test in relation with frequencies of the noises.

According to this measurement, it is understood that each transmission loss of the above mentioned various working examples is large than that of the comparative example a in a case in which the compound rate of the predetermined binder fiber is set to be a compound rate within a predetermined compound rate range (20(%) to 60(%)), the outer diameter of each of the thick fibers of PET is set to be an outer diameter within a predetermined outer diameter range (35 (μm) to 120 (μm)), and the mass compound ratio of the thick fibers of PET is set to be a mass compound ratio within a predetermined range (25(%) to 70(%)), and thus the various working examples can obtain transmission loss beyond the mass law within the frequency range of 315 (Hz) to 1600 (Hz) of the noises, thereby to have better sound insulation performance than that of the comparative example a. In addition, the various working examples have respectively better sound insulation performance than that of the comparative example a in the high frequency range of 1600 (Hz) to 6300 (Hz), as conventionally.

This means that in the various working examples, sound insulation performance is largely improved compared to the comparative example a especially in the frequency range of the noises from the low frequency range to the middle frequency range.

The reason why a lower limit value and a upper limit value of the predetermined outer diameter range are set to 35 (μm) and 120 (μm) respectively because it does not lead to an improvement as the soundproof body in the frequency range of the noises from the low frequency range to the middle frequency range in case in which the outer diameter of each of the fibers of PET is less than 35 (μm) or more than 120 (μm).

In addition, it is understood that according to each graph in FIG. 4, the more the compound amount of the predetermined binder fiber, the more the frequency range improving sound insulation performance moves to the high frequency range side when the compound rate of the thick fibers and the predetermined binder fiber is changed while maintaining the outer diameter of each of the thick fibers constant.

Second Embodiment

Figure 6:
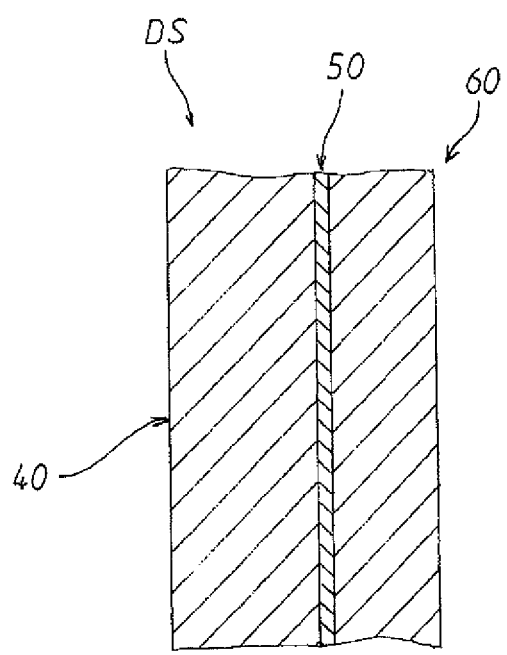
FIG. 6 indicates a partially enlarged cross-sectional view illustrating a main portion of a second embodiment of the present invention.

FIG. 6 indicates a main part of a second embodiment of the present invention. In the second embodiment, a felt layer 60 is additionally adopted, in addition to the two-layer lamination structure formed by the felt layer 40 and the film layer 50 in the dash silencer DS which is described in the first embodiment.

The felt layer 60 is laminated on the felt layer 40 through the film layer 50 so as to form a three-layer lamination structure, together with the felt layer 40 and the film layer 50.

A plurality of fibers constructing the felt layer 60 are formed by the six kinds of fibers of PET, cotton, wool, hemp, silk, and nylon described in the first embodiment. However, the fibers of PET are formed by a thin fiber of 20 (μm) similar to each of the fibers of cotton, wool, hemp, silk, and nylon. Accordingly, the felt layer 60 is softer than the felt layer 40 including the thick fibers of PET as described above. This means that the felt layer 60 is hard to affect vibration of the film layer 50 compared to the felt layer 40. In addition, each fiber constructing the felt layer 60 are parallel along both surfaces of the felt layer 60. Other construction of the second embodiment is similar to that of the first embodiment.

In the second embodiment constructed in such a manner, the felt layer 60 is laminated on the felt layer 40 through the film layer 50 as described above.

Accordingly, when the noises from the engine room 10 pass through the felt layer 40 and the film layer 50 of the dash silencer DS, as in the first embodiment described above, the noises reach the felt layer 60.

Herein, the felt layer 60 is formed softer than the felt layer 40 as described above. Accordingly, the felt layer 60 is hard to affect the vibration of the film layer 50. Thus, mainly, the felt layer 40 controls the vibration of the film layer 50 in the frequency range of the noises from the low frequency range to the middle frequency range in the same manner as described in the first embodiment, thereby to improve the sound insulation performance as the soundproof body, while the felt layer 60 exhibits merely the sound absorption performance against the noises.

Accordingly, the felt layer 40 improves largely the sound insulation performance beyond the mass law in the frequency range of the noises from the low frequency range to the middle frequency range of the film layer 50 as described in the first embodiment. Thus, the noises are absorbed by the felt layer 60 after being insulated under the sound insulation performance beyond the mass law by the film layer 50 based on the lamination structure of the felt layer 40 and the film layer 50.

As a result, a soundproof effect of the dash silencer DS of the second embodiment can be further improved by the sound absorption of the felt layer 60, compared to an effect of soundproof caused by sound insulation of the two-layer lamination structure of the felt layer 40 and the film layer 50. This means that the soundproof effect as the dash silencer DS can be further improved by the synergistic effect of the sound insulation effect of the felt layer 40 and the film layer 50 and the sound absorption effect of the felt layer 60. Other operation and effect of the second embodiment are similar to those of the first embodiment.

Third Embodiment

Figure 7:
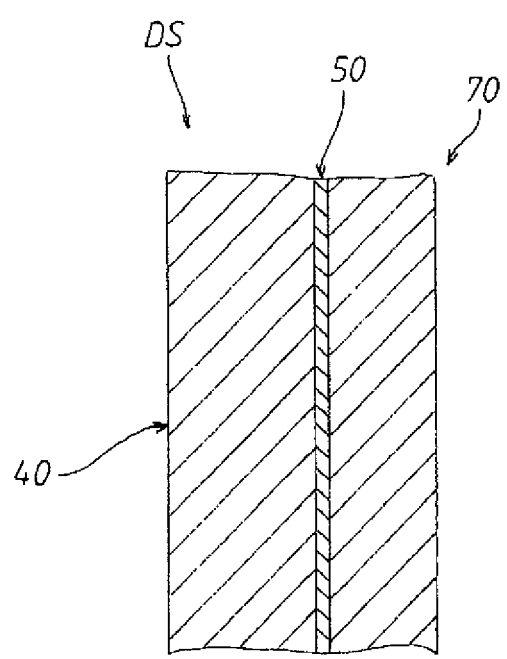
FIG. 7 indicates a partially enlarged cross-sectional view illustrating a main portion of a third embodiment of the present invention.

FIG. 7 indicates a main part of a third embodiment of the present invention. In the third embodiment, a felt layer 70 is additionally adopted in addition to the two-layer lamination structure formed by the felt layer 40 and the film layer 50 in the dash silencer DS described in the first embodiment.

The felt layer 70 is laminated on the felt layer 40 through the film layer 50, thereby to form a three-layer lamination structure together with the felt layer 40 and the film layer 50.

In the third embodiment, the felt layer 70 is formed by the six kinds of fibers of PET, cotton, wool, hemp, silk, and nylon similarly to the felt layer 40 described in the first embodiment. The felt layer 70 is selected at each outer diameter of fibers of PET thereof to an outer diameter larger than an average outer diameter (20 (μm)) of the remaining fibers of cotton, wool, hemp, silk, and nylon.

However, the felt layer 70 is different in its construction from the felt layer 40 in the following points. That is, the outer diameter of each of the fibers of PET (or the outer diameter and the mass compound ratio of the fibers of PET) in the felt layer 70 is set to be further larger than the outer diameter of each of the thick fibers of PET of the felt layer 40 (or the outer diameter and the mass compound ratio of the fibers of PET).

This is because the felt layer 70 makes sure to become the same hardness as the felt layer 40, although the felt layer 70 is thinner than the felt layer 40. Accordingly, the felt layer 70 exerts the same influence as the felt layer 40 against the vibration of the film layer 50, thereby to further improve the sound insulation performance as a soundproof body by synergistic operation with the felt layer 40 in the frequency range of the noises from the low frequency range to the middle frequency range. Other constructions of the third embodiment are similar to those of the first embodiment.

In the third embodiment constructed in this way, the felt layer 70 largely improves the sound insulation performance of the film layer 50 together with the felt layer 40, as described above. Accordingly, when the noises from the engine room 10 reaches the felt layer 70 through the felt layer 40 and the film layer 50 of the dash silencer DS, the noises can be further preferably insulated by the synergistic improvement function of the both felt layers 70 and 40 against the sound insulation performance of the film layer 50 as described above. As a result, according to the dash silencer DS of the third embodiment, the soundproof effect against the noises can be further improved. Other operation and effect are similar to those of the first embodiment.

Fourth Embodiment

Figure 8:
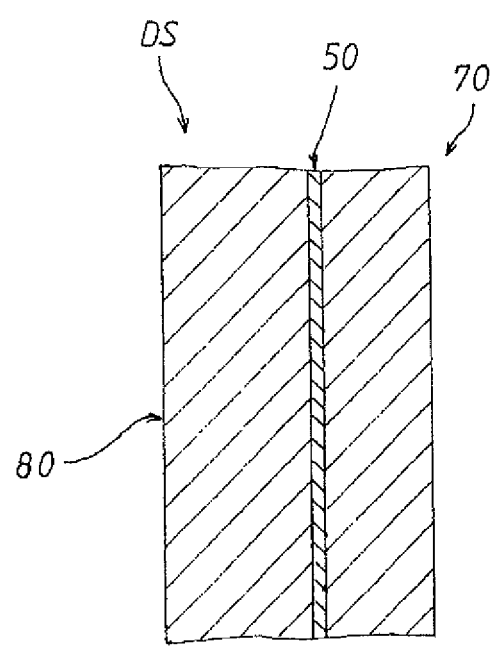
FIG. 8 indicates a partially enlarged cross-sectional view illustrating a main portion of a fourth embodiment of the present invention.

FIG. 8 indicates a main part of a fourth embodiment of the present invention. In the fourth embodiment, a felt layer 80 is adopted in place of the felt layer 40 in the three-layer lamination structure (see FIG. 7) constructed by the felt layer 40, the film layer 50 and the felt layer 70 of the dash silencer DS described in the third embodiment (see FIG. 8).

In the fourth embodiment, the felt layer 80 is mounted along the dash panel 30 between the dash panel 30 and the film layer 50. A plurality of fibers constructing the felt layer 80 are formed by the six kinds of fibers of PET, cotton, wool, hemp, silk, and nylon described in the first embodiment. However, the fibers of PET are formed respectively by a thin fiber of 20 (μm) similarly to each fiber of cotton, wool, hemp, silk, and nylon. Thus, the felt layer 80 is softer than the felt layer 40 including the thick fibers of PET as described above. This means that the felt layer 80 is harder to affect the vibration of the film layer 50 than the felt layer 70, and therefore exerts mere sound absorption performance. Other construction of the fourth embodiment is similar to that of the third embodiment.

In the fourth embodiment constructed in this way, the felt layer 80 is interposed or sandwiched between the dash panel 30 and the film layer 50 as described above. Herein, the felt layer 80 is hard to affect the vibration of the film layer 50, since the felt layer 80 is formed softer than the felt layer 70 as described above. Accordingly, the felt layer 80 exerts merely the sound absorption performance over all frequency ranges of the noises. Thus, the noises are absorbed by the felt layer 80 and then reach the film layer 50.

When the noises reach the film layer 50 in this way, the felt layer 70 functions against the vibration of the film layer 50 so as to improve the sound insulation performance of the film layer 50 beyond the mass law in the frequency range of the noises from the low frequency range to the middle frequency range, as described in the third embodiment.

Accordingly, the felt layer 70 can preferably improve the sound insulation performance as the soundproof body by controlling the vibration of the film layer 50 in the frequency range of the noises from the low frequency range to the middle frequency range, in the same manner as described in the third embodiment.

As a result, even if the dash silencer DS has the three-layer lamination structure constructed by the felt layer 80 without thick fibers, the film layer 50, and the felt layer 70 with thick fibers as described in the fourth embodiment, the preferable soundproof effect against the noises can be obtained. Other operation and effect are similar to those of the third embodiment except the operation and effect caused by the felt layer 40.

Fifth Embodiment

Figure 9:
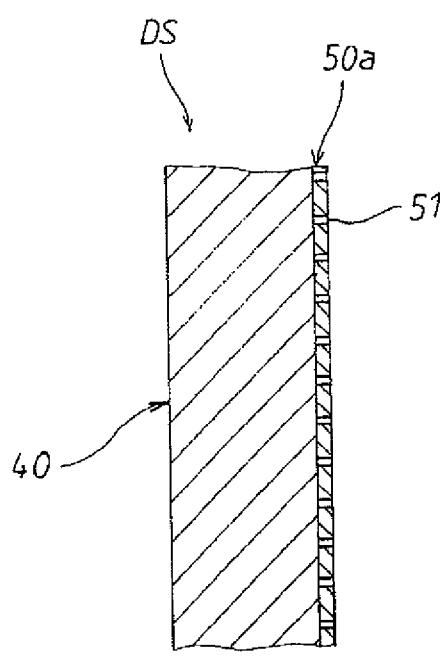
FIG. 9 indicates a partially enlarged cross-sectional view illustrating a main portion of a fifth embodiment of the present invention.

FIG. 9 indicates a main part of a fifth embodiment of the present invention. In the fifth embodiment, a perforated film layer 50a is adopted in place of the film layer 50 in the dash silencer described in the first embodiment.

The perforated film layer 50a is a kind of an air permeable layer and is formed by a film layer having a plurality of through hole portions 51 so as to have air permeability of 40 (cm/s) or less. Accordingly, an opening diameter and an opening ratio of each of the plurality of through hole portions 51 are set such that the perforated film layer 50a can exert the sound insulation performance under the vibration control thereof, substantially similarly to that of the film layer 50 over the frequency range of the noises from the low frequency range to the middle frequency range. Thus, the perforated film layer 50a can exert the sound insulation performance under the vibration control by the felt layer 40, substantially similarly to that of the film layer 50 described in the first embodiment.

In addition, the perforated film layer 50a is not limited to the perforated film layer described above, and therefore may be an air permeable layer having the air permeability of a predetermined upper limit or less. The upper limit of the air permeability denotes the air permeability of 40 (cm/s). This is because it is impossible to secure sound insulation performance like the non-air permeable layer when the air permeability is higher than 40 (cm/s). Other construction of the fifth embodiment is similar to that of the first embodiment.

In the fifth embodiment constructed in such a manner, when the noises are incident on the dash silencer DS similarly to the first embodiment, the noises are partially absorbed by the felt layer 40 under its porosity or porous property and then incident on the perforated film layer 50a through the felt layer 40. And then, the noises generates the vibration in the perforated film layer 50a, substantially similarly to the film layer 50 described in the first embodiment.

At this stage, the phase of the vibration of the perforated film layer 50a when the noises pass through the felt layer 40 on a basis of air propagation does not become the same phase of the vibration of the perforated film layer 50a when the noises are transmitted to the perforated film layer 50a through the felt layer 40 by solid propagation but becomes a phase appropriately shifted toward an opposite phase in the frequency range from the low frequency range to the middle frequency range. Thus, the sound insulation performance of the perforated film layer 50a is largely improved.

In other words, even if the perforated film layer 50a having the above described construction is laminated on the felt layer 40 from its rear side, the sound insulation performance of the dash silencer DS can be improved substantially similarly to the first embodiment in the frequency range of the noises from the low frequency range to the middle frequency range. This means that the soundproof effect by the dash silencer DS against the noises can be preferably attained in the frequency range of the noises from the low frequency range to the high frequency range.

In addition, even if the perforated film layer 50 in either embodiment of the second to fourth embodiments is substituted by the film layer 50a of the fifth embodiment, the operation and effect in either embodiment of the second to fourth embodiments can be substantially similarly attained.

Sixth Embodiment

Figure 10:
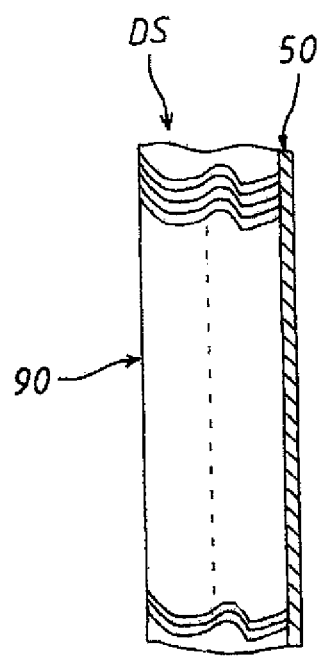
FIG. 10 indicates a partially enlarged cross-sectional view illustrating a main portion of a sixth embodiment of the present invention.

FIG. 10 indicates a main part of a sixth embodiment of the present invention. In the sixth embodiment, a felt layer 90 is adopted in place of the felt layer 40 (see FIG. 3) in the dash silencer DS described in the first embodiment. Accordingly, a dash silencer DS of the sixth embodiment is, as shown in FIG. 10, constructed by the felt layer 90, and the film layer 50 (see FIG. 3) described in the first embodiment.

Herein, the felt layer 90 is formed in a curved shape in a vertical cross section similar to the shape of the dash panel 30 described in the first embodiment and is mounted along the dash panel 30 from an inner side of the vehicle compartment 20. Further, the film layer 50 is laminated along the felt layer 90 from a side opposite to the dash panel 30.

The felt layer 90 is formed at its plural fibers (six kinds of fibers) by compounding PET and each of other fibers (each of fibers formed of cotton, wool, hemp, silk, and nylon) uniformly into a predetermined binder fiber, similarly to the felt layer 40 described in the first embodiment.

Herein, the fibers of PET among the six kinds of fibers forming the felt layer 90 are formed respectively by a thick fiber similar to each of the fibers of PET among the six kinds of fibers forming the felt layer 40 described in the first embodiment. Further, each of the other fibers (each fiber of cotton, wool, hemp, silk, and nylon) described above is formed by a thin fiber similar to each fiber of cotton, wool, hemp, silk, and nylon among the six kinds of fibers forming the felt layer 40 described in the first embodiment.

However, in the sixth embodiment, the six kinds of fibers forming the felt layer 90 are compounded into the predetermined binder fiber so as to be substantially orthogonal to both surfaces of the felt layer 90, differing from the six kinds of fibers forming the felt layer 40 described in the first embodiment.

In the sixth embodiment, the felt layer 90 has a thickness of 15 (mm), differing from the thickness of the felt layer 40 described in the first embodiment. The felt layer 90 is formed by the six kinds of fibers so as to have the basis weight of 800 (g/m$^2$), which is different from the basis weight of 1000 (g/m$^2)$ of the felt layer 40. Further, in the felt layer 90, a thickness of each of the fibers of PET is 100 (μm) similarly to the thickness of each fiber of PET of the felt layer 40 in the first embodiment, and the content of the fibers of PET is 50(%). Further, in the felt layer 90, the content of the predetermined binder fiber is a binder fiber of which content is 30(%). Additionally, the content of the other fibers, namely, cotton, wool, hemp, silk, and nylon, is 30(%).

Further, in the sixth embodiment, the six kinds of fibers forming the felt layer 90 are compounded into the above mentioned predetermined binder fiber such that the six kinds of fibers are waved to be substantially orthogonal to both surfaces corresponding to the both surfaces of the felt layer 90 under an oven heating treatment by, for example, Rand Feeder (product name) manufactured by RAND MACHIN CORPORATION. Accordingly, the six kinds of fibers forming the felt layer 90 are compounded into the predetermined binder fiber so as to be substantially orthogonal to the both surfaces of the felt layer 90, namely to be oriented or directed to the thickness direction of the felt layer 90. This means that the six kinds of fibers are arranged in the thickness direction of the felt layer 90. Hereinafter, arrangement of the six kinds of fibers is also referred to as a thickness direction arrangement). Other construction of the sixth embodiment is similar to that of the first embodiment.

In the sixth embodiment formed in such a manner, the six kinds of fibers forming the felt layer 90 are compounded into the predetermined binder fiber so as to be directed or oriented in the thickness direction of the felt layer 90, as described above. Herein, the fibers of PET among the six kinds of fibers of the felt layer 90 are formed by thick fibers similar to those of the first embodiment than the remaining fibers.

Thus, elasticity of the six kinds of fibers of the felt layer 90 is largely enhanced, compared to elasticity of the six kinds of fibers arranged along the both surfaces of the felt layer 40 as described in the first embodiment. As a result, the sound insulation performance of the felt layer 90 against the noises can be greatly improved, compared with the case where six kinds of fibers are arranged along both surfaces of a felt layer as the felt layer 40. Such an improvement of the sound insulation performance of the felt layer 90 against the noises can be remarkably achieved especially against noise components in the low frequency range and middle frequency range of the noises described in the first embodiment. Other operation and effect are substantially similar to those of the first embodiment.

Incidentally, denoting the dash silencer DS constructed as described above as a working example 6 (see FIG. 11), a transmission loss characteristic of the working example 6 was measured by a transmission loss test in relation with the frequency of the noises. The working example 6 is, as shown in FIG. 11, formed by the lamination structure of a film layer and a first felt layer. In the working example 6, the film layer is formed by a non-air permeable layer having a basis weight of 30 (g/cm$^2$).

The first felt layer is formed by the six kinds of fibers, namely each fibers of cotton, wool, hemp, silk, nylon, and PET, as described above. In the first felt layer, a basis weight is 800 (g/cm$^2$) and content of the binder fiber is 30(%). Thickness of each fiber of PET is 30 (μm), and content of the fibers of PET 50 (%). Content of the binder fiber is 30(%), content of the remaining fibers (cotton, wool, hemp, silk, and nylon) is 30(%), and thickness of the first felt layer is 15 (mm) (see FIG. 12).

Further, the six kinds of fibers of the first felt layer are constructed to have the thickness direction arrangement. A Young's modulus of the first felt layer is 85000 (see FIG. 12).

For this measurement, working examples 7 and 8, and comparative examples b and c were prepared. Construction of each of the working examples 7 and 8, and the comparative examples b and c is as follows.

Each of the working examples 7 and 8, and the comparative examples b and c is formed by lamination structure of a film layer and a felt layer. As shown in FIG. 12, the film layer of each of the working examples 7 and 8, and the comparative examples b and c is formed by a non-air permeable layer having a basis weight of 30 (g/cm$^2$).

Further, as shown in FIG. 11, the felt layers of the working examples 7 and 8 and the comparative examples b and c correspond respectively to second and third felt layers and fourth and fifth felt layers. Each of the second felt layer, the third felt layer, the fourth felt layer, and the fifth felt layer has a basis weight of 800 (g/cm$^2$) and the thickness of 15 (mm) (see FIG. 12), similarly to those of the first felt layer.

Further, in each of the second to fifth felt layers, both of content of the binder fiber and content of the other fibers are 30(%) (see FIG. 12).

Herein, in the felt layer (second felt layer) of the working example 7, thickness of each fiber of PET is 30 (μm) and content of the fibers of PET is 30(%), and a Young's modulus of the fibers of PET is 25000. Further, in the second felt layer, arrangement of the six kinds of fibers is set to the thickness direction arrangement (see FIG. 12).

In the felt layer (third felt layer) of the working example 8, thickness of each fiber of PET is 30 (μm) and content of the fibers of PET is 50(%), and a Young's modulus of the fibers of PET is 25000. Further, in the third felt layer, arrangement of the six kinds of fibers is set to the thickness direction arrangement (see FIG. 12).

In the felt layer (fourth felt layer) of the comparative example b, thickness of each fiber of PET is 30 (μm) and content of the fibers of PET is 50(%) (see FIG. 12). Although the thickness of the fiber of PET of the fourth felt layer is thicker than a normal thickness as described above, the arrangement of the six kinds of fibers of the fourth felt layer is not the thickness direction arrangement but a normal arrangement (a parallel arrangement to both surfaces of the fourth felt layer) (see FIG. 12).

Further, in the felt layer (fifth felt layer) of the comparative example c, thickness of each fiber of PET is thinner than the thickness of each fiber of PET in each of the first to fourth felt layers, and therefore is set to a normal thickness of 20 (μm), and content of the fibers of PET is set to 50(%) (see FIG. 12). An arrangement of the six kinds of fibers of the fifth felt layer is not the thickness direction arrangement but a normal arrangement (a parallel arrangement to both surfaces of the fifth felt layer) (see FIG. 12).

According to the above description, each fiber of PET in the felt layer of each of the working examples 6, 7, and 8 and the comparative example b is thicker than each fiber of PET in the conventional normal felt layer of the comparative example c.

Although the arrangement of the six kinds of fibers in the felt layer of each of the working examples 6, 7 and 8 is the thickness direction arrangement, the arrangement of the six kinds of fibers in the felt layer of each of the comparative examples b and c is the conventional normal arrangement, namely an arrangement parallel to the both surfaces of the corresponding felt layer.

Further, when comparing the Young's modulus of each of the working examples 6, 7, and 8 and the comparative example c, each Young's modulus of the working examples 6, 7, and 8 is largely increased compared to the Young's modulus of the comparative example c.

This is based on the following grounds. The arrangement of the six kinds of fibers in the felt layer of each of the working examples 6, 7 and 8 is set to the thickness direction arrangement, differing from the arrangement of the six kinds of fibers of the comparative example c, as described above. Thus, the elasticity in the thickness direction of the felt layer of each of the working examples 6, 7 and 8 is remarkably increased compared to the elasticity in the thickness direction of the felt layer of the comparative example c. This is the grounds that each Young's modulus of the felt layers of the working examples 6, 7, and 8 is largely increased compared to the Young's modulus of the felt layers of the comparative example c.

Furthermore, regarding each of the working examples 6, 7 and 8 and the comparative examples b and c, transmission loss characteristic was measured in relation with the frequency of the noises.

Figure 13:
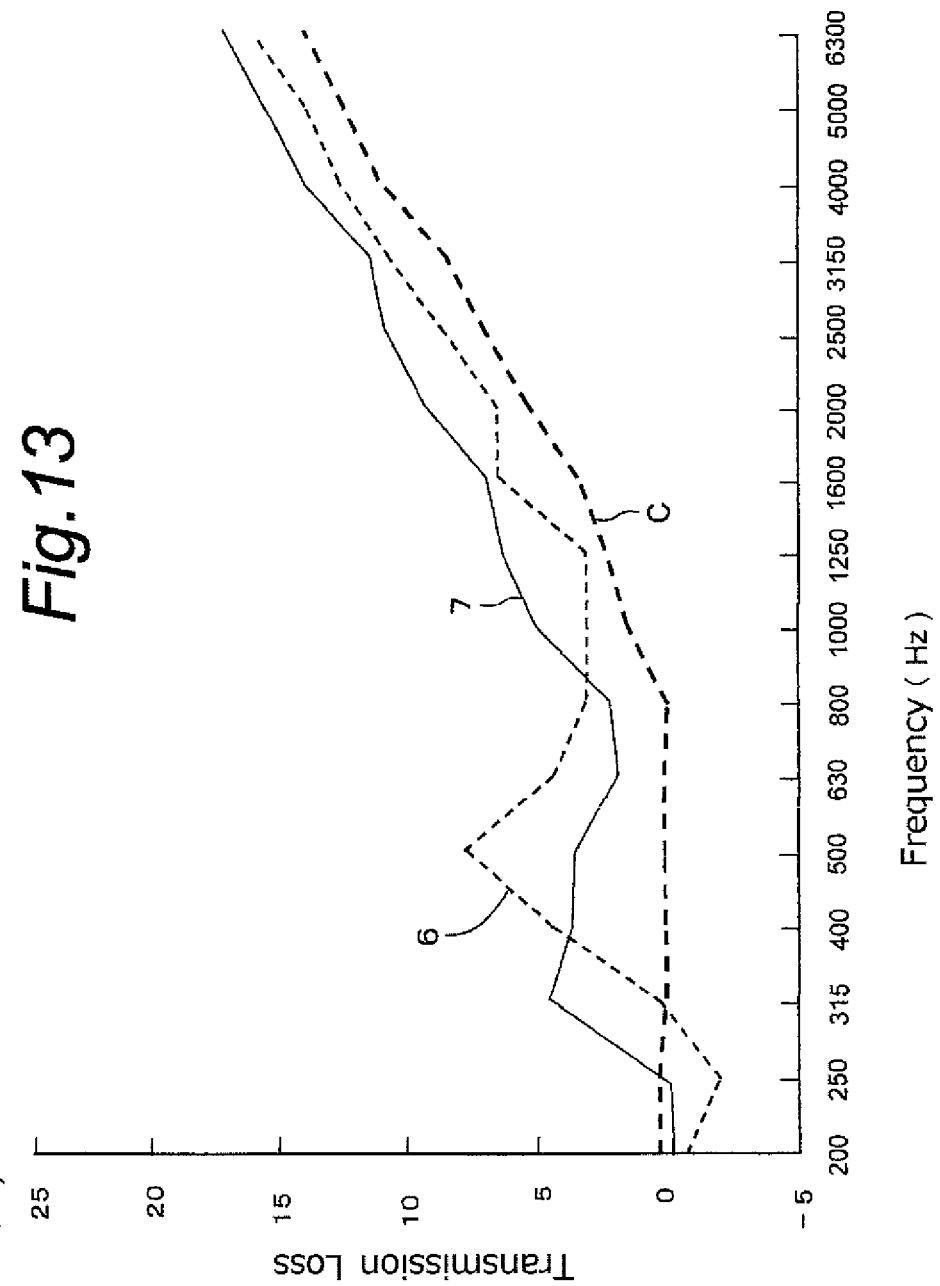
FIG. 13 indicates graphs of which each illustrates a relationship between a transmission loss and a frequency of noises in each of working examples 6 and 7 and a comparative example c according to the sixth embodiment.

When each relationship between the transmission loss and the frequency for each of the working examples 6, 7 and the comparative example c is shown by each of graphs based on each measurement result regarding the working examples 6, 7 and the comparative example c, the result as shown FIG. 13 was obtained. In FIG. 13, a graph 6 indicates the relationship between the transmission loss and the frequency of the working example 6, a graph 7 indicates the relationship between the transmission loss and the frequency of the working example 7, and a graph c indicates the relationship between the transmission loss and the frequency of the comparative example c.

According to these descriptions, it is understood that the transmission loss of each of the examples 6 and 7 is largely increased compared to the transmission loss of the comparative example c in a range of 315 (Hz) to 400 (Hz) among the low frequency range of the noises and the middle frequency range of 400 (Hz) to 1600 (Hz) of the noises.

This means that the sound insulation performance of each of the working examples 6 and 7 can be largely improved compared to the sound insulation performance of the comparative example c. This is based on that, in each of the working examples 6 and 7, the arrangement of each fiber of the felt layer is set to the thickness direction arrangement, differing from each fiber of the conventional felt layer, in addition to the fact that the fibers of PET of the felt layer are respectively thicker than each fiber of PET of the conventional felt layer (the felt layer of the comparative example c). Additionally, the working examples 6 and 7 have respectively the preferable sound insulation performance in the high frequency range of 1600 (Hz) to 6300 (Hz), as conventionally.

Figure 14:
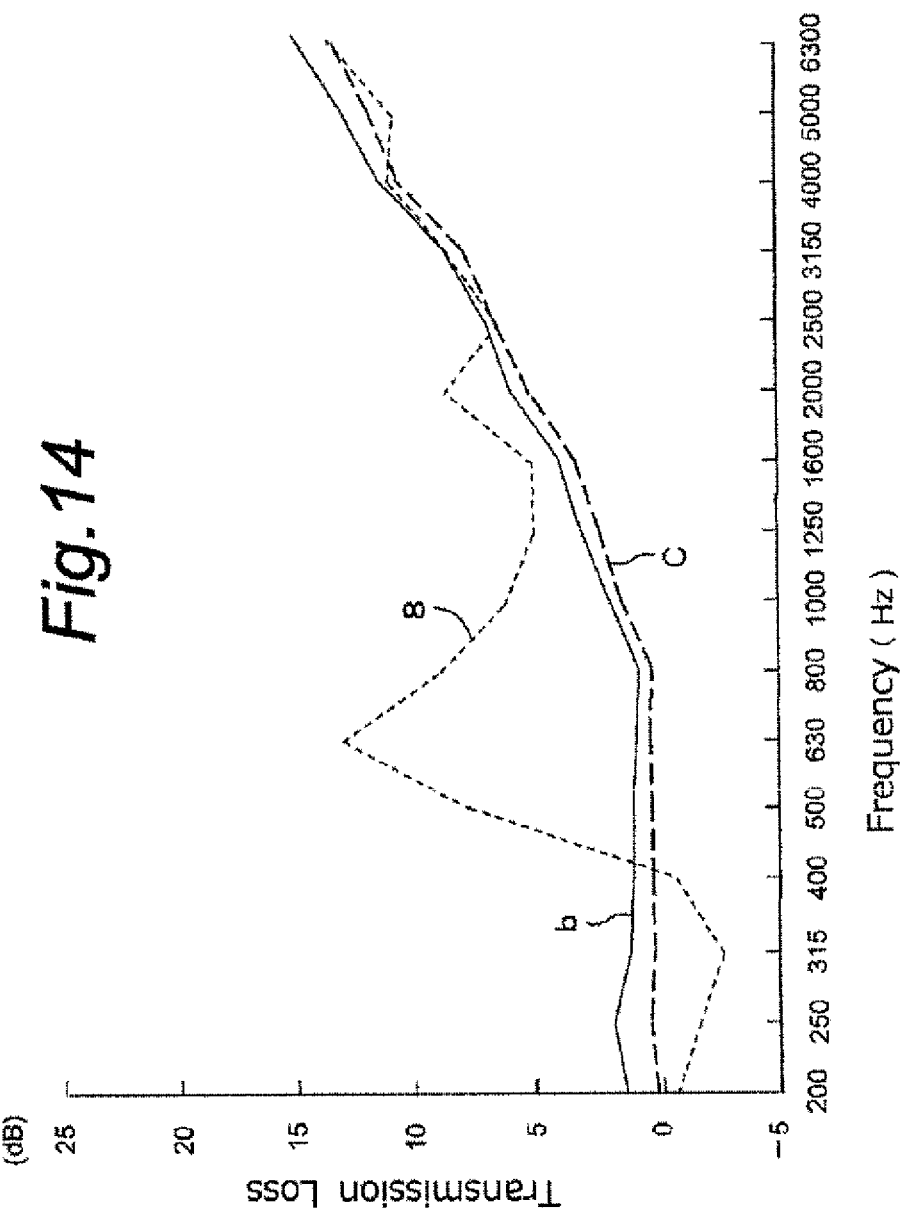
FIG. 14 indicates graphs of which each illustrates a relationship between a transmission loss and a frequency of noises in each of working example 8 and comparative examples b and c according to the sixth embodiment.

When each relationship between the transmission loss and the frequency for each of the working example 8 and the comparative example b, c is shown by each of graphs based on each measurement result regarding the working example 8 and the comparative example b, c, the result as shown FIG. 14 was obtained. In FIG. 14, a graph 8 indicates the relationship between the transmission loss and the frequency of the working example 8, a graph b indicates the relationship between the transmission loss and the frequency of the comparative example b, and a graph c indicates the relationship between the transmission loss and the frequency of the comparative example c.

According to these graphs, it is understood that the transmission loss of the working example 8 is largely increased compared to the transmission loss of each of the comparative examples b and c in the middle frequency range of 400 (Hz) to 1600 (Hz) of the noises.

This means that the sound insulation performance of the working example 8 can be greatly improved compared to the sound insulation performance of each of the comparative examples b and c in the middle frequency range of the noises. This is based on that, in the working example 8, the arrangement of each fiber of the felt layer is set to the thickness direction arrangement, differing from each fiber of the comparative example b and the conventional felt layer (the felt layer of the comparative example c), in addition to the fact that the fibers of PET of the felt layer are respectively thicker than each fiber of PET of the conventional felt layer (the felt layer of the comparative example c).

Further, the arrangement of each fiber of the felt layer of the comparative example b is set to the normal arrangement (arrangement parallel to both surfaces of a felt layer), differing from the thickness direction arrangement of each fiber in the felt layer of the working example 8, although each fiber of PET in the felt layer of the comparative example b is thicker than each fiber of PET in the conventional felt layer. Accordingly, it is recognized from FIG. 14 that the transmission loss of the comparative example b, in other words, the sound insulation performance is also remarkably less compared to the example 8.

As described above, in summary, the arrangement of each fiber of the felt layer is the thickness direction arrangement, differing from the conventional felt layer, in addition to the fact that each fiber of PET of the felt layer is thicker than that of the conventional felt layer. Thus, the transmission loss of each of the working examples 6 to 8, in other words, the sound insulation performance of each of the working examples 6 to 8 is largely improved and remarkably increased compared to the comparative examples b and c in at least the middle frequency range of the noises.

Furthermore, various working examples having felt layers in which a compound rate of the predetermined binder fiber, an outer diameter of each fiber of PET and a mass compound ratio are different and each of which fibers are arranged in the thickness direction arrangement were prepared in addition to the working examples 6 to 8. And transmission loss characteristic of each of these various working examples was measured by the transmission loss test in relation with the frequency of the noises.

According to the measurement, in case that in the various working examples, the arrangement of the six kinds of fibers is set to the thickness direction arrangement, in addition to the fact that compound rate of the predetermined binder fiber is set to a value within the predetermined range (20(%) to 60(%)), an outer diameter of each of the thick fibers of PET is set to a value within the predetermined range (35 (μm) to 120 (μm)), and mass compound ratio of the thick fibers of PET is set to a value within the predetermined range (25(%) to 70(%)) in the frequency range of the noises from the low frequency range to the middle frequency, as described in the first embodiment, each transmission loss of the various working examples is higher than those of the comparative example b and c. Thus, it is understood that each of the various working examples can obtain the transmission loss beyond the mass law within the frequency range of 400 (Hz) to 1600 (Hz) of the noises, and therefore has better sound insulation performance than that of each of the comparative examples b and c.

Further, in a case that at least the arrangement of each thick fiber of PET among the six kinds of fibers in the felt layer is set to the thickness direction arrangement, it is understood that the transmission loss of each of the working examples 6 to 8 is substantially largely improved at least in the middle frequency range of the noises, compared to the comparative examples b and c.

Seventh Embodiment

Figure 15:
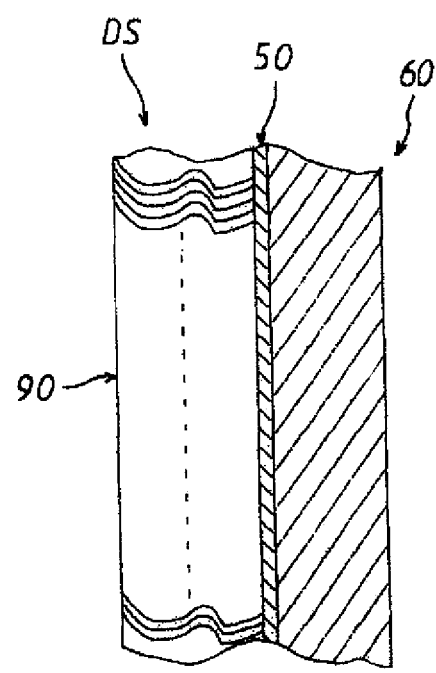
FIG. 15 indicates a partially enlarged cross-sectional view illustrating a main portion of a seventh embodiment of the present invention.

FIG. 15 indicates a main part of a seventh embodiment of the present invention. In the seventh embodiment, the felt layer 60 described in the second embodiment (see FIG. 6) is additionally adopted, in addition to the two-layer lamination structure formed by the felt layer 90 and the film layer 50 in the dash silencer DS (see FIG. 10) described in the sixth embodiment.

The felt layer 60 is laminated on the felt layer 90 through the film layer 50 so as to form the dash silencer DS having a three-layer lamination structure, together with the felt layer 90 and the film layer 50.

Herein, the felt layer 90 described in the sixth embodiment is formed to be thick at its fibers of PET among the six kinds of fibers and formed to be thin at each fiber of the remaining cotton, wool, hemp, silk, and nylon, as described above. In the felt layer 90, the six kinds of fibers are compounded into the predetermined binder fiber so as to be orthogonal to the both surfaces of the felt layer 90.

Further, the felt layer 60 described in the second embodiment is formed by a thin fiber of 20 ($\mu$m) at each fiber of PET, cotton, wool, hemp, silk, and nylon of the six kinds of fibers and is arranged at each fiber thereof to be parallel along the both surfaces thereof, as described above. Other construction of the seventh embodiment is similar to that of the sixth embodiment or the second embodiment.

In the seventh embodiment constructed in such a manner, the fibers of PET among the six kinds of fibers in the felt layer 90 are formed to be thicker than the remaining fibers, as described in the sixth embodiment. Moreover, the six kinds of fibers are arranged to be directed in the thickness direction of the felt layer 90. Further, the felt layer 60 is formed at the six kinds of fibers thereof to be thin, as described above.

With this construction, the sound insulation performance of the felt layer 90 against the noises can be largely improved as described in the sixth embodiment. Moreover, the felt layer 60 is formed at the six kinds of fibers thereof to be thin. Accordingly, the felt layer 60 is softer than the felt layer 90 having the thick fibers of PET. Thus, the felt layer 60 is hard to affect the film layer 50 compared to the felt layer 90. As a result, the felt layer 60 exerts the mere sound absorption performance against the noise as described in the sixth embodiment.

Accordingly, a soundproof effect can be further improved only sound absorption by the felt layer 60 compared to the soundproof effect by sound insulation by the two-layer lamination structure formed by the film 50 and the felt layer 90 in which the arrangement of the six kinds of fibers is set to a substantially orthogonal arrangement and each fiber of PET is set to be thick. As a result, the soundproof effect as the dash silencer DS can be further improved. Other operation and effect are similar to those of the second embodiment or the sixth embodiment.

Eighth Embodiment

Figure 16:
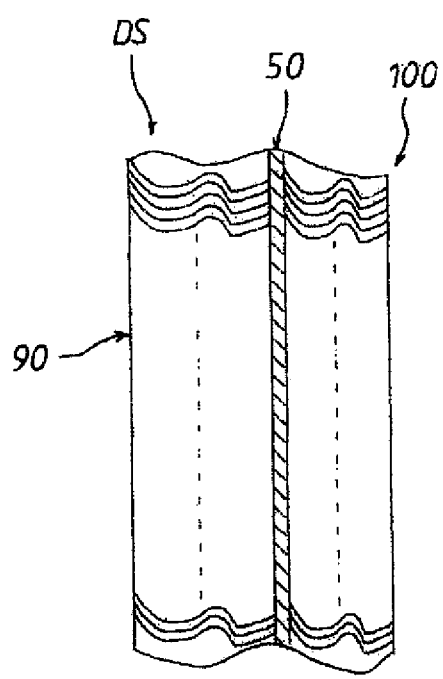
FIG. 16 indicates a partially enlarged cross-sectional view illustrating a main portion of an eighth embodiment of the present invention.

FIG. 16 indicates a main part of an eighth embodiment of the present invention. In the eighth embodiment, a felt layer 100 (see FIG. 16) is additionally adopted, in addition to the two-layer lamination structure formed by the felt layer 90 and the film layer 50 in the dash silencer DS (see FIG. 10) described in the sixth embodiment.

The felt layer 100 is laminated on the felt layer 90 through the film layer 50, thereby to form a dash silencer DS of a three-layer lamination structure together with the film layer 50 and the felt layer 90.

The felt layer 100 has a construction as same as that of the felt layer 70 described in the third embodiment except for the following differences.

The differences are described as below. The six kinds of fibers of PET, cotton, wool, hemp, silk, and nylon constructing the felt layer 70 are compounded into the above described predetermined binder fiber so as to be arranged substantially orthogonal to and between both surfaces corresponding to the both surfaces of the felt layer 100 and to be waved. Accordingly, the plural fibers forming the felt layer 100 are compounded into the predetermined binder fiber such that the plural fibers are arranged to be substantially orthogonal to the both surfaces of the felt layer 100.

Herein, the outer diameter (or the outer diameter and the mass compound ratio) of each fiber of PET in the felt layer 100 is selected so as to be larger than the outer diameter (or the outer diameter and the mass compound ratio) of each thick fiber of PET in the felt layer 40 described in the first embodiment, in other words, the outer diameter (or the outer diameter and the mass compound ratio) of each thick fiber of PET in the felt layer 90, similarly to the outer diameter (or the outer diameter and the mass compound ratio) of each fiber of PET in the felt layer 70.

Thus, the felt layer 100 has the same hardness as that of the felt layer 90, although it is thinner than the felt layer 90. Accordingly, the felt layer 100 exerts the same influence as that of the felt layer 90 against vibration of the film layer 50, thereby to act a role of further improving sound insulation performance as a soundproof body under the synergistic effect with the felt layer 90 in the frequency range of the noises from the low frequency range to the middle frequency range Herein, the elasticity of the plural fibers of the felt layer 100 is largely enhanced together with the elasticity of the plural fibers of the felt layer 90, compared with the case of arranging a plurality of fibers along both surfaces of a felt layer like the felt layer 40 described in the first embodiment. As a result, the sound insulation performance of the felt layer 100 against the noises can be greatly improved together with the sound insulation performance of the felt layer 90 against the noises, compared with the case of arranging a plurality of fibers along both surfaces of a felt layer like the felt layer 40. Other construction of the eighth embodiment is substantially similar to that of the first, the second or the seventh embodiment.

In the eighth embodiment constructed in such a manner, the felt layer 100 further improves the sound shield performance of the film layer 50 together with the felt layer 90 under the construction in which the felt layer 100 is arranged at its plural fibers so as to be orthogonal to its both surfaces (to be substantially orthogonal arrangement) as described above. Accordingly, when the noises from the engine room 10 reach the felt layer 100 through the felt layer 90 and the film layer 50 of the dash silencer DS, the noises can be further preferably insulated by the synergistic improving function of the both felt layers 90 and 100 against the sound insulation performance of the film layer 50 as described above. As a result, according to the dash silencer DS of the eighth embodiment, the soundproof effect against the noises can be further improved. Other operation and effect are similar to those of the first, the second or the seventh embodiment.

Ninth Embodiment

Figure 17:
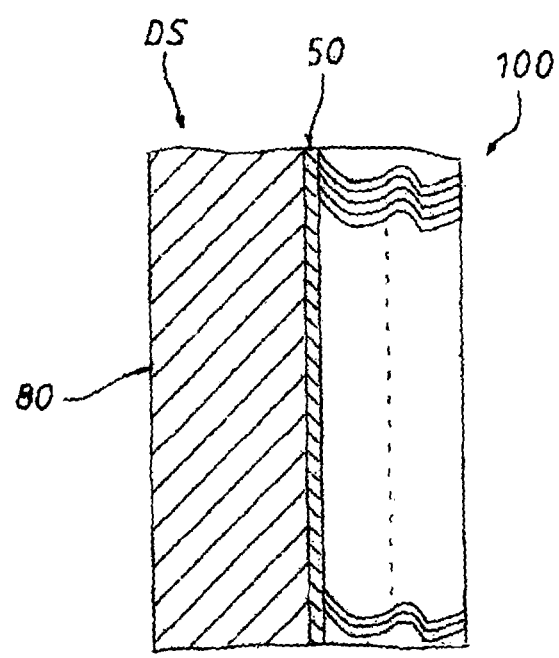
FIG. 17 indicates a partially enlarged cross-sectional view illustrating a main portion of a ninth embodiment of the present invention.

FIG. 17 indicates a main part of a ninth embodiment of the present invention. In the ninth embodiment, the felt layer 80 described in the fourth embodiment is adopted in place of the felt layer 90 in the three-layer lamination structure (see FIG. 16) formed by the felt layer 90, the film layer 50, and the felt layer 100 of the dash silencer DS described in the eighth embodiment.

Herein, the felt layer 80 is constructed by the six kinds of fibers of PET, cotton, wool, hemp, silk, and nylon, each of which is formed by a thin fiber having a thickness of 20 ($\mu$m) and is mounted along the dash panel 30 between the dash panel 30 and the film layer 50, as described above. Accordingly, the felt layer 80 is softer than the felt layer 100 having thick fibers of PET, and therefore exerts mere sound absorption performance. Other construction of the ninth embodiment is similar to the eighth or the fourth embodiment.

In the ninth embodiment formed in such a manner, the felt layer 80 is hard to affect the vibration of the film layer 50, since the felt layer 80 is softer than the felt layer 100, as described above. Accordingly, the noises are absorbed by the felt layer 80 and then reach the film layer 50.

When the noises reach the film layer 50 in this way, the felt layer 100 functions against the vibration of the film layer 50 so as to further improve the sound insulation performance of the film layer 50 beyond the mass law under the substantially orthogonal compound of the plural fibers to its both surfaces in the frequency range of the noises from the low frequency range to the middle frequency range, in the same manner as described in the eighth embodiment.

Accordingly, the felt layer 100 can preferably improve the sound insulation performance as the soundproof body by controlling the vibration of the film layer 50 in the frequency range of the noises from the low frequency range to the middle frequency range, as the same as described in the eighth embodiment.

As a result, even if the dash silencer DS is constructed by the three-layer lamination structure which is formed by the felt layer 80 without the thick fibers, the film layer 50, and the felt layer 70 having the thick fibers and being arranged at its plural fibers in the above described substantially orthogonal compound, like the ninth embodiment, the further preferable soundproof effect against the noises can be exerted. Other operation and effect are similar to those of the eighth, or the fourth embodiment except for the operation and effect caused by the felt layer 100.

Tenth Embodiment

Figure 18:
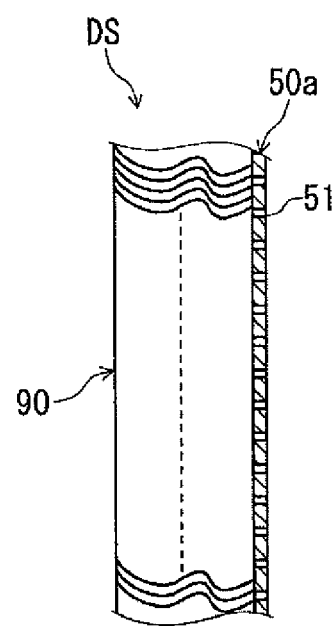
FIG. 18 indicates a partially enlarged cross-sectional view illustrating a main portion of a tenth embodiment of the present invention.

FIG. 18 indicates a main part of a tenth embodiment of the present invention. In the tenth embodiment, the perforated film layer 50*a* described in the fifth embodiment is adopted in place of the film layer 50 described in the sixth embodiment (see FIG. 10). Accordingly, the dash silencer DS of the tenth embodiment is formed by the two-layer lamination structure which is constructed by the felt layer 90 described in the seventh embodiment and the perforated film layer 50*a* described in the fifth embodiment.

The perforated film layer 50*a* is formed by a film layer having the plurality of through holes 51 so as to have the air permeability of 40 (cm/s) or less, as described above. Thus, the perforated film layer 50*a* can exert the substantially same sound insulation performance as that of the film layer 50 described in the first embodiment under the vibration control by the felt layer 90. Other construction of the tenth embodiment is similar to the seventh or the fifth embodiment.

In the tenth embodiment formed in this way, when the noises are incident on the dash silencer DS similarly to the fifth embodiment, the noises are partially absorbed by the felt layer 90 based on its porous property and then are incident on the perforated film layer 50*a* through the felt layer 90. And then, the noises cause vibration in the perforated film layer 50*a* substantially similar to the film layer 50 described in the first embodiment.

At this stage, the phase of the vibration in the perforated film layer 50*a* when the noises pass through the felt layer 90 based on air propagation does not become the same phase of the vibration in the perforated film layer 50*a* when the noises are transmitted to the perforated film layer 50*a* through the felt layer 90 based on solid propagation but becomes to be appropriately shifted toward an opposite phase in a frequency range from a low frequency range to a middle frequency range. Accordingly, the sound insulation performance of the perforated film layer 50*a* is largely improved.

Herein, in the felt layer 90, the elasticity is enhanced, since the plurality of fibers of the felt layer 90 are arranged to be substantially orthogonal to the both surfaces of the felt layer 90, as described above. Accordingly, the sound insulation performance is largely improved, as described above. Thus, under such a sound insulation performance of the felt layer 90 the noises are insulated by the felt layer 90 and then incident on the perforated film layer 50*a*. As a result, the dash silencer DS can insulate the noises with further preferable sound insulation performance thereof. Other operation and effect are similar to those of the sixth or the fifth embodiment.

Eleventh Embodiment

Figure 19:
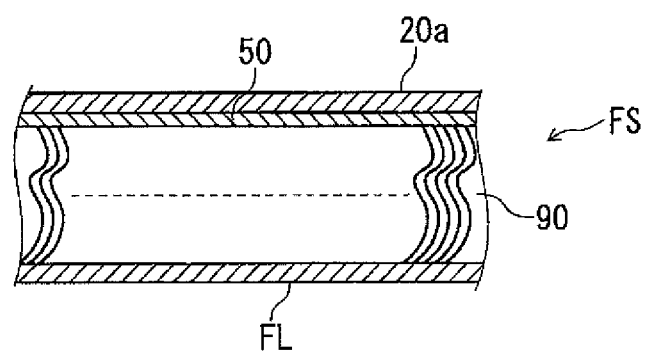
FIG. 19 indicates a partially enlarged cross-sectional view illustrating a floor silencer arranged on a floor of a motor vehicle as a main portion of an eleventh embodiment of the present invention.

FIG. 19 indicates a main part of an eleventh embodiment of the present invention. In the eleventh embodiment, an example in which the present invention is applied to a motor vehicle as a floor silencer (hereinafter, referred to as a floor silencer FS) among silencers for motor vehicles is indicated.

The floor silencer FS is interposed between a floor carpet 20*a* and a floor FL over a whole surface of the floor carpet 20*a* (see FIG. 19).

The floor silencer FS has the same construction as that of the dash silencer DS (see FIG. 10) described in the sixth embodiment. The floor silencer FS is arranged at the felt layer 90 along the floor FL. Accordingly, the floor silencer FS is interposed at the film layer 50 between the felt layer 90 and the floor carpet 20*a*.

Herein, the felt layer 90 is formed thickly at each fiber of PET among its six kinds of fibers and formed thinly at each fiber of the remaining cotton, wool, hemp, silk, and nylon, as described in the sixth embodiment. Further, in the felt layer 90, the six kinds of fibers are compounded into the predetermined binder fiber so as to be arranged to be substantially orthogonal to the both surfaces of the felt layer 90, as described above. And, the film layer 50 is a non-air permeable layer, as described above. In addition, other construction of the eleventh embodiment is similar to that of the sixth embodiment.

According to the eleventh embodiment constructed in such a manner, even when in travelling of the motor vehicle on a road, road noises generated from the road or engine sounds generated so as to go around to a lower side of the floor FL from the engine E are incident as a noise on the felt layer 90 of the floor silencer FS through the floor FL, the noises can be preferably insulated or soundproofed from the vehicle compartment by the sound insulation performance of the felt layer 90 described in the sixth embodiment, coupled with the sound insulation performance of the film layer 50. Other operation and effect are substantially similar to those of the sixth embodiment.

Twelfth Embodiment

Figure 20:
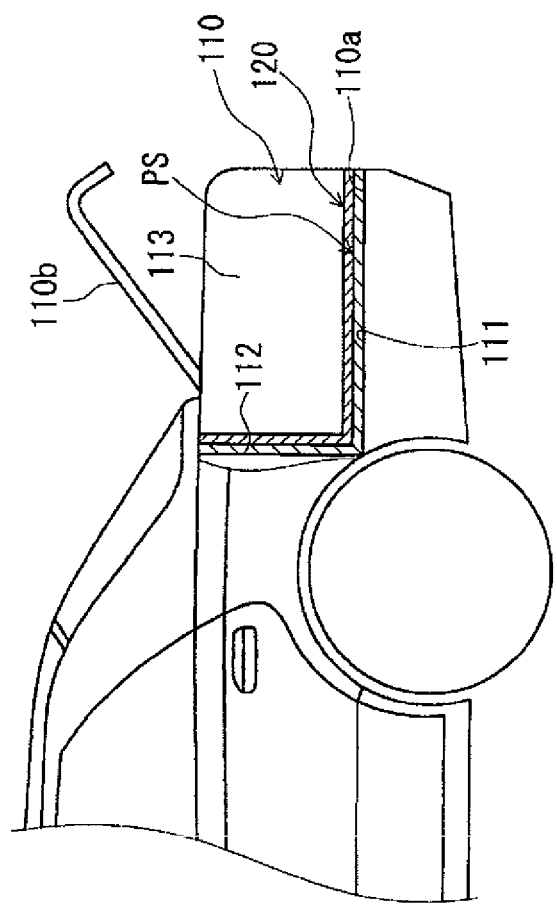
FIG. 20 indicates a schematic partial cross-sectional view of a rear portion of a motor vehicle to which a twelfth embodiment in which the silencer for motor vehicles according to the present invention is adopted as a partition silencer is applied.
Figure 21:
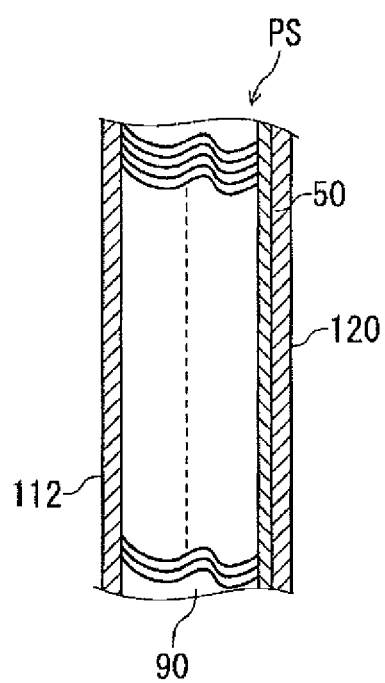
FIG. 21 is a partially enlarged cross-sectional view illustrating the partition silencer arranged in a trunk of a motor vehicle according to the twelfth embodiment.

FIG. 20 indicates an example in which the present invention is applied to a trunk 110 of a motor vehicle as a partition silencer (hereinafter, referred to as a partition silencer PS) among silencers for vehicles.

As shown in FIG. 20, the trunk 110 is mounted at a rear portion of the motor vehicle (a rear portion of a vehicle body). The trunk 110 is constructed by a trunk room 110*a* and a cover 110*b*.

The trunk room 110*a* is mounted in the rear portion of the motor vehicle. The trunk room 110*a* is formed by a bottom wall 111, a front wall 112, and right and left side walls 113 (a right side wall 113 is only shown in FIG. 20) so as to be opened toward both of an upper side and a rear side. The front wall 112 rises upward from a front end portion of the bottom wall 111. The right and left side walls 113 are extended from the front wall 112 in parallel to each other, and rise upward from right and left side portions of the bottom wall 111, respectively. With this construction, the trunk room 110*a* can store a luggage (not shown) from its upper side and rear side.

The cover 110*b* is formed in an L-shaped longitudinal section. The cover 110*b* is hinge-coupled at its base end portion to a front end portion of an upper side opening portion 111 of the trunk room 110*a* so as to be openable and closable in a vertical direction. Thus, the cover 110*b* can open and close the trunk room 110*a* from the upper side and the rear side of the trunk room 110*a*.

Further, a trunk trim 120 is disposed along the bottom wall 111, the front wall 112, and the right and left side walls 113 in the trunk room 110*a* through the partition silencer PS. The trunk trim 120 acts a role for protection of the luggage and/or improvement of an appearance in the trunk room 110*a*.

The partition silencer PS is interposed between the bottom wall 111, the front wall 112, and the right and left side walls 113 of the trunk room 110*a*, and the trunk trim 120 so as to be along the bottom wall 111, the front wall 112 and the right and left side walls 113.

The partition silencer PS has the same construction as that of the above described floor silencer FS. The partition silencer PS is arranged at the felt layer 90 along the bottom wall 111, the front wall 112, and the right and left side walls 113 in the trunk room 110*a*. Accordingly, the partition silencer PS is interposed at the film layer 50 between the felt layer 90 and the trunk trim 120.

Herein, the felt layer 90 is formed thickly at each fiber of PET among the six kinds of fibers thereof and formed thinly at each fiber of the remaining cotton, wool, hemp, silk, and nylon, as described in the sixth embodiment. Further, in the felt layer 90, the six kinds of fibers are compounded into the predetermined binder fiber so as to be arranged to be substantially orthogonal to the both surfaces of the felt layer 90, as described above. And, the film layer 50 is the non-air permeable layer, as described above. In addition, other construction of the twelfth embodiment is similar to that of the sixth embodiment.

According to the twelfth embodiment constructed in such a manner, even when in travelling of the motor vehicle on a road, road noises generated from a rear wheel RW try to be incident as noises on the vehicle compartment 20 through the trunk room 110*a* from the bottom wall 111, the right and left side walls 113 or the like of the trunk room 110*a* closed by the cover 110*b* under the construction of the felt layer 90, the noises can be preferably insulated or soundproofed from the vehicle compartment 20 by the partition silencer PS with the sound insulation performance of the felt layer 90 described in the sixth embodiment, coupled with the sound insulation performance of the film layer 50. Other operation and effect are substantially similar to those of the sixth embodiment.

Additionally, in the eleventh embodiment (or the twelfth embodiment), the three-layer lamination structure (see FIG. 15) formed by the felt layer 90, the film layer 50, and the felt layer 60 described in the seventh embodiment, the three-layer lamination structure (see FIG. 16) formed by the felt layer 90, the film layer 50, and the felt layer 100 described in the eighth embodiment, the three-layer lamination structure (see FIG. 17) formed by the felt layer 80, the film layer 50, and the felt layer 100 described in the ninth embodiment, or the two-layer lamination structure (see FIG. 18) formed by the felt layer 90, and the perforated film layer 50*a* described in the tenth embodiment may be adopted as the floor silencer (or the partition silencer) in place of the two-layer lamination structure formed by the felt layer 90 and the film layer 50 constructing the floor silencer FS (or the partition silencer PS).

In this case, in the three-layer lamination structure shown in FIG. 15 or FIG. 16, the felt layer 90 is disposed between the floor FL and the floor carpet 20*a* (or between the bottom wall 111, the front wall 112, and the right and left side walls 113 of the trunk room 110*a* and the trunk trim 120), along the floor FL (or along the bottom wall 111, the front wall 112, and the right and left side walls 113 of the trunk room 110*a*). In the three-layer lamination structure shown in FIG. 17, the felt layer 80 is disposed between the floor FL and the floor carpet 20*a* (or between the bottom wall 111, the front wall 112, and the right and left side walls 113 of the trunk room 110*a* and the trunk trim 120), along the floor FL (or along the bottom wall 111, the front wall 112, and the right and left side walls 113 of the trunk room 110*a*). In the two-layer lamination structure shown in FIG. 18, the felt layer 90 is disposed between the floor FL and the floor carpet 20*a* (or between the bottom wall 111, the front wall 112, and the right and left side walls 113 of the trunk room 110*a* and the trunk trim 120), along the floor FL (or along the bottom wall 111, the front wall 112, and the right and left side walls 113 of the trunk room 110*a*).

According to these constructions, an operation and effect in which the noises from the lower side of the floor FL are soundproofed from the vehicle compartment by the floor silencer as described above (or an operation and effect in which the noises from an outside of the trunk room 110*a* are soundproofed from the vehicle compartment by the partition silencer PS as described above) can be attained substantially similarly to the operation and effect described in either of the seventh to tenth embodiments.

Furthermore, in the eleventh embodiment (or the twelfth embodiment), the two-layer lamination structure (see FIG. 3) formed by the felt layer 40 and the film layer 50 described in the first embodiment, the three-layer lamination structure (see FIG. 6) formed by the felt layer 40, the film layer 50, and the felt layer 60 described in the second embodiment, the three-layer lamination structure (see FIG. 7) formed by the felt layer 40, the film layer 50, and the felt layer 60 described in the third embodiment, the three-layer lamination structure (see FIG. 8) formed by the felt layer 40, the film layer 50, and the felt layer 70 described in the fourth embodiment, or the two-layer lamination structure (see FIG. 9) formed by the felt layer 40 and the perforated film layer 50*a* described in the ninth embodiment may be adopted as the floor silencer (or the partition silencer) in place of the two-layer lamination structure formed by the felt layer 90 and the film layer 50 forming the floor silencer FS (or the partition silencer PS).

In this case, in the two-layer lamination structure shown in FIG. 3, the felt layer 40 is disposed between the floor FL and the floor carpet 20*a* (or between the bottom wall 111, the front wall 112, and the right and left side walls 113 of the trunk room 110*a* and the trunk trim 120), along the floor FL (or along the bottom wall 111, the front wall 112, and the right and left side walls 113 of the trunk room 110*a*). In the three-layer lamination structure shown in FIG. 6 or FIG. 7, the felt layer 40 is disposed between the floor FL and the floor carpet 20*a* (or between the bottom wall 111, the front wall 112, and the right and left side walls 113 of the trunk room 110*a* and the trunk trim 120), along the floor FL (or along the bottom wall 111, the front wall 112, and the right and left side walls 113 of the trunk room 110*a*). In the three-layer lamination structure shown in FIG. 8, the felt layer 80 is disposed between the floor FL and the floor carpet 20*a* (or between the bottom wall 111, the front wall 112, and the right and left side walls 113 of the trunk room 110*a* and the trunk trim 120), along the floor FL (or along the bottom wall 111, the front wall 112, and the right and left side walls 113 of the trunk room 110*a*). Further, in the two-layer lamination structure shown in FIG. 9, the felt layer 40 is disposed between the floor FL and the floor carpet 20*a* (or between the bottom wall 111, the front wall 112, and the right and left side walls 113 of the trunk room 110*a* and the trunk trim 120), along the floor FL (or along the bottom wall 111, the front wall 112, and the right and left side walls 113 of the trunk room 110*a*).

According to this construction, an operation and effect in which the noises from the lower side of the floor FL are soundproofed from the vehicle compartment by the floor silencer as described above (or an operation and effect in which the noises from an outside of the trunk room 110*a* are soundproofed from the vehicle compartment by the partition silencer PS as described above) can be attained substantially similarly to the operation and effect described in either of the first to ninth embodiments.

Additionally, in practicing the present invention, the following various modifications are mentioned, without being limited to the above described embodiments and modifications.

(1) In practicing the present invention, the fibers forming the felt layer may be formed of acryl, rayon, polyester, polyolefin, polyethylene, polypropylene, vinylon, natural fiber, or the like without being limited to the fibers described in the embodiments.

Herein, the fibers constructing the felt layer are not limited to the six kinds of fibers and may be, for example, four kinds, five kinds, seven kinds of fibers or the like.

(2) In practicing the present invention, the material forming the film layer 50 may be PE, PP, nylon, or the like. The film layer 50 may be multiple layers such as three layers without being limited to a single layer. Furthermore, the material forming the film layer 50 may be EPDM, olefin, EVA, vinyl chloride, or the like in case of a sound insulation sheet.

(3) In practicing the present invention, the air permeable layer may be PE, nylon, PP, or the like in case of a perforated film layer, and PE, PET, PP, nylon, or the like in case of a non-woven fabric layer.

(4) In practicing the present invention, in the felt layer, other fibers may be thick in place of the fibers of PET. In this case, other fibers may be also thick in addition to the fibers of PET, and the fibers to be thickened may be a plurality of fibers.

(5) In practicing the present invention, the thickness direction arrangement of each fiber in the felt layer is not limited to an arrangement in which the fibers are arranged to be substantially orthogonal to the both surfaces of the felt layer, and therefore may be an arrangement or array in which the fibers are arranged to cross the both surfaces of the felt layer between the both surfaces of the felt layer, namely, a cross direction arrangement or array.

In this case, as a cross or intersection angle of the fibers against the both surfaces of the felt layer increases, the elastic force as the felt layer increases. Thus, the transmission loss as the dash silencer, namely a degree of the improvement of the sound insulation performance can be improved. In addition, the cross angle described above is preferably set to be a value in a range of greater than 45 degrees and less or equal to 90 degrees against the both surfaces of the felt layer. This is because an elastic component of the elasticity or elastic force of the felt layer toward both sides thereof is larger than an elastic component toward the direction along both surfaces of the felt layer.

(6) Further, in practicing the present invention, in the twelfth embodiment, the partition silencer PS may be applied in a luggage compartment such as a luggage compartment of a light vehicle, a station wagon, a light van, or the like without limiting to a luggage compartment such as the trunk of the motor vehicle. In addition, along with this construction, the trunk trim may be grasped as a luggage trim. Generally, the trunk trim may be grasped as a luggage compartment trim including the luggage trim.

(7) In practicing the present invention, the partition silencer PS may be interposed between the trunk trim 120 and, for example, only both of the bottom wall 111 and the front wall 112, only the bottom wall 111, or only the front wall 112, without spanning the bottom wall 111, the front wall 112, and the left and right side walls 113 of the entire wall of the trunk room.

EXPLANATION OF REFERENCE NUMERAL

DS . . . dash silencer, FL . . . floor, FS . . . floor silencer, PS . . . partition silencer, 20 . . . floor carpet, 30 . . . dash panel, 40,60,70,80,90,100 . . . felt layer, 50 . . . film layer, 50*a* . . . perforated film layer, 110 . . . trunk, 111 . . . bottom wall, 112 . . . front wall, 113 . . . left and right side walls, 110*a* . . . trunk room, 120 . . . trunk trim.

What is claimed is:

1. A soundproof body comprising:
  a felt layer formed by compounding plural kinds of fibers into a predetermined binder fiber; and
  a non-air permeable layer that is on and in direct contact with said felt layer,
  wherein said felt layer is formed at a one kind of fibers of the plural kinds of the fibers by fibers thicker than the remaining kinds of the plural kinds of the fibers, and
  the fibers thicker than the remaining kinds of the plural kinds of the fibers are set at their outer diameter respectively to be a value that changes each of vibrations caused by air propagation and solid propagation between said non-air permeable layer and said felt layer in opposite phases to each other in a frequency range of noises from a low frequency range to a middle frequency range.

2. The soundproof body according to claim 1, wherein the plural kinds of the fibers of said felt layer are compounded into the predetermined binder fiber so as to be arranged in the thickness direction of said felt layer from the one surface of both surfaces of said felt layer to the other surface of said felt layer so as to increase rigidity of said felt layer.

3. The soundproof body according to claim 2, further comprising,
  denoting said felt layer as a one side felt layer, an other side felt layer being on and in direct contact with said non-air permeable layer so as to face said one side felt layer through said non-air permeable layer,
  wherein said other side felt layer is formed by compounding plural kinds of fibers into a predetermined binder fiber, the plural kinds of fibers being thinner than the one kind of the fibers of the plural kinds of the fibers of said one side felt layer so as to be softer than said one side felt layer.

4. A dash silencer for motor vehicles mounted to a dash panel partitioning an engine room and a vehicle compartment of said vehicle body, the dash silencer including said soundproof body of claim 1,
wherein said soundproof body is mounted at said felt layer to said dash panel from an inner side of said vehicle compartment of said vehicle body.

5. A dash silencer for motor vehicles mounted to a dash panel partitioning an engine room and a vehicle compartment of said vehicle body, the dash silencer including said soundproof body of claim 1,
wherein denoting said felt layer of said soundproof body as a one side layer, said soundproof body further includes an other side felt layer formed by compounding plural kinds of fibers into a predetermined binder fiber, said other side felt layer being on and in direct contact with said non-air permeable layer so as to face said one side felt layer through said non-air permeable layer,
wherein the plural kinds of the fibers of said one side felt layer are compounded into the predetermined binder fiber so as to be arranged in the thickness direction of said one side felt layer from the one surface of both surfaces of said one side felt layer to the other surface of said one sider felt layer so as to increase rigidity of said one side felt layer, and
wherein said soundproof body is mounted at said one side felt layer to said dash panel from an inner side of said vehicle compartment of said vehicle body.

6. A soundproof body comprising:
a felt layer formed by compounding plural kinds of fibers into a predetermined binder fiber; and
a perforated film layer that is on and in direct contact with said felt layer, said perforated film layer being a film layer having a plurality of through hole portions respectively with an opening diameter and an opening ratio such that said perforated film layer has the same air permeability as that of a non-air permeable layer in a predetermined frequency range of noises from low frequency range to a middle frequency range,
wherein said felt layer is formed at a one kind of fibers of the plural kinds of the fibers by fibers thicker than the remaining kinds of the plural kinds of the fibers, and
the fibers thicker than the remaining kinds of the plural kinds of the fibers are set at their outer diameter respectively to be a value that changes each of vibrations caused by air propagation and solid propagation between said perforated film layer and said felt layer in opposite phases to each other in the predetermined frequency range.

7. The soundproof body according to claim 6, wherein the plural kinds of the fibers of said felt layer are compounded into the predetermined binder fiber so as to be arranged in the thickness direction of said felt layer from the one surface of both surfaces of said felt layer to the other surface of said felt layer so as to increase rigidity of said felt layer.

8. The soundproof body according to claim 7, further comprising,
denoting said felt layer as a one side felt layer, an other side felt layer being on and in direct contact with said perforated film layer so as to face said one side felt layer through said perforated film layer,
wherein said other side felt layer is formed by compounding plural kinds of fibers into a predetermined binder fiber, the plural kinds of fibers being thinner than the one kind of the fibers of the plural kinds of the fibers of said one side felt layer so as to be softer than said one side felt layer.

9. A dash silencer for motor vehicles mounted to a dash panel partitioning an engine room and a vehicle compartment of said vehicle body, the dash silencer including said soundproof body of claim 6,
wherein said soundproof body is mounted at said felt layer to said dash panel from an inner side of said vehicle compartment of said vehicle body.

10. A dash silencer for motor vehicles mounted to a dash panel partitioning an engine room and a vehicle compartment of said vehicle body, the dash silencer including said soundproof body of claim 6,
wherein denoting said felt layer of said soundproof body as a one side layer, said soundproof body further includes an other side felt layer formed by compounding plural kinds of fibers into a predetermined binder fiber, said other side felt layer being on and in direct contact with said non-air permeable layer so as to face said one side felt layer through said non-air permeable layer,
wherein the plural kinds of the fibers of said one side felt layer are compounded into the predetermined binder fiber so as to be arranged in the thickness direction of said one side felt layer from the one surface of both surfaces of said one side felt layer to the other surface of said one sider felt layer so as to increase rigidity of said one side felt layer, and
wherein said soundproof body is mounted at said one side felt layer to said dash panel from an inner side of said vehicle compartment of said vehicle body.

\* \* \* \* \*